United States Patent
Haney

(10) Patent No.: US 8,142,176 B2
(45) Date of Patent: Mar. 27, 2012

(54) AUTOMATED CONTROLLED ATMOSPHERIC PRESSURIZED RESIN INFUSION

(75) Inventor: Richard M. Haney, Enumclaw, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/709,485

(22) Filed: Feb. 21, 2010

(65) Prior Publication Data

US 2010/0151067 A1    Jun. 17, 2010

Related U.S. Application Data

(63) Continuation of application No. 11/225,962, filed on Sep. 14, 2005, now Pat. No. 7,690,911.

(30) Foreign Application Priority Data

Mar. 15, 2005  (TW) ................................. 94107950 A

(51) Int. Cl.
*B29C 45/00* (2006.01)

(52) U.S. Cl. ............... 425/129.1; 425/389; 425/405.1; 264/571

(58) Field of Classification Search ............... 425/129.1, 425/389, 405.1; 264/571
See application file for complete search history.

(56) References Cited

U.S. PATENT DOCUMENTS

| | | | | |
|---|---|---|---|---|
| 5,454,991 A * | 10/1995 | Brew | ............... | 264/39 |
| 5,516,271 A * | 5/1996 | Swenor et al. | ................. | 425/127 |
| 5,518,385 A * | 5/1996 | Graff | ............... | 425/127 |
| 5,624,693 A * | 4/1997 | Horling et al. | ................. | 425/146 |
| 5,820,894 A * | 10/1998 | Kreutzer | ............... | 425/389 |
| 7,083,403 B2 * | 8/2006 | Arai | ............... | 425/400 |
| 7,305,308 B2 * | 12/2007 | Daniel et al. | ................. | 702/35 |
| 2005/0079241 A1 * | 4/2005 | Moore et al. | ............... | 425/388 |

* cited by examiner

Primary Examiner — Christina Johnson
Assistant Examiner — Saeed Huda

(57) ABSTRACT

An apparatus comprising a vacuum source line, a pressurized fluid source line and an inlet circuit communicative with the vacuum source line and operatively connectable to an inlet container. The apparatus further comprises an outlet circuit communicative with the vacuum source line and operatively connectable to an outlet line. The apparatus also comprises an outer cover circuit communicative with the vacuum source line and operatively connectable to the outer cover. Further, the apparatus comprises an inlet restrictor fluid circuit in communicative with the fluid source line and adapted to control flow between the inlet vacuum container and interior. Moreover, the apparatus comprises a controller operatively connected to the inlet vacuum circuit, the outlet vacuum circuit, the outer cover vacuum circuit and the inlet restrictor fluid circuit for controlling operation of the inlet vacuum circuit, the outlet vacuum circuit, the outer cover vacuum circuit and the inlet restrictor fluid circuit, respectively.

16 Claims, 20 Drawing Sheets

AUTOMATED CONTROLLED ATMOSPHERIC PRESSURIZED RESIN INFUSION

BACKGROUND OF THE INVENTION

The present invention relates to an apparatus used to infuse a part with resin and, more particularly to an automated controlled atmospheric pressurized resin infusion apparatus.

Resin infusion processes are traditionally performed by one or more workers who manually carry out steps of the process. Manual performance of infusion operations is very time consuming and prone to error. For example, when workers need to ensure that a bag does not have leaks, they must create a vacuum in the bag, wait for the in-bag vacuum to reach a steady level and monitor the pressure in the bag during the entire leak check.

Worker errors include skipping needed steps in the infusion process, performing steps out of order and performing steps inconsistently or improperly. For example, although a first bag must be checked for leaks before a second bag is checked for leaks according to process specifications, a worker may check the second bag for leaks first, which may result in inaccurate bag checks. Skipping steps may result in a bad part, wasted manufacturing and part materials and lost worker time.

Even when the worker performs the infusion process steps in order, the steps can be improperly performed. For example, the worker may prematurely stop the resin from infusing through the part, thinking the part was fully infused and cure an incomplete part. As another example, a worker may perform a compacting step in an inconsistent manner from one infusion to the next, resulting in inconsistent parts. Parts often need to be discarded for having improper dimensions resulting from improper resin infusion.

BRIEF SUMMARY OF THE INVENTION

The present invention relates to apparatus for infusing a part with resin using a process in which the apparatus is used in combination with a part support adapted for supporting the part. In the process, the apparatus is further used in combination with an inner cover securable to the part support to define with the support a sealed interior enclosing the part, an outer cover securable to the part support for enclosing the inner cover, an inlet vacuum container operatively connected to the interior for introducing resin to the interior and an outlet vacuum line operatively connected to the interior for pulling a vacuum in the interior to draw resin into the interior thereby infusing the part. The apparatus comprises a vacuum source line adapted for connecting to a vacuum source and a pressurized fluid source line adapted for connecting to a pressurized fluid source. The apparatus further comprises an inlet vacuum circuit in fluid communication with the vacuum source line and operatively connectable to the inlet vacuum container for selectively introducing a vacuum to the inlet vacuum container. The apparatus also comprises an outlet vacuum circuit in fluid communication with the vacuum source line and operatively connectable to the outlet vacuum line for selectively introducing a vacuum to the outlet vacuum line. Yet further, the apparatus comprises an outer cover vacuum circuit in fluid communication with the vacuum source line and operatively connectable to the outer cover for selectively introducing a vacuum to the outer cover. In addition, the apparatus comprises an inlet restrictor fluid circuit in fluid communication with the pressurized fluid source line and adapted to selectively permit and restrict flow between the inlet vacuum container and the interior. Further, the apparatus comprises a controller operatively connected to the inlet vacuum circuit, the outlet vacuum circuit, the outer cover vacuum circuit and the inlet restrictor fluid circuit for controlling operation of the inlet vacuum circuit, the outlet vacuum circuit, the outer cover vacuum circuit and the inlet restrictor fluid circuit, respectively.

In another aspect, the present invention comprises a system for infusing a part with resin comprising a part support adapted for supporting the part, an inner cover securable to the part support to define with the support a sealed interior enclosing the part and an outer cover securable to the part support for enclosing the inner cover. The system further comprises an inlet vacuum container operatively connected to the interior for introducing resin to the interior and an outlet vacuum line operatively connected to the interior for pulling a vacuum in the interior to draw resin into the interior thereby infusing the part. The system also comprises an apparatus including a body, a vacuum pump mounted on the body and an inlet vacuum circuit mounted on the body in fluid communication with the vacuum pump and operatively connected to the inlet vacuum container for selectively introducing a vacuum to the inlet vacuum container. The apparatus further comprises an outlet vacuum circuit mounted on the body in fluid communication with the vacuum pump and operatively connected to the outlet vacuum line for selectively introducing a vacuum to the outlet vacuum line and an outer cover vacuum circuit mounted on the body in fluid communication with the vacuum pump and operatively connected to the outer cover for selectively introducing a vacuum to the outer cover. The apparatus also comprises a pressurized fluid source line mounted on the body and adapted for connection to a pressurized fluid source. In addition, the apparatus comprises an inlet restrictor fluid circuit in fluid communication with the pressurized fluid source line and adapted to selectively permit and restrict flow between the inlet vacuum container and the interior. Further the apparatus comprises a controller operatively connected to the vacuum pump, the inlet vacuum circuit, the outlet vacuum circuit, the outer cover vacuum circuit and the inlet restrictor fluid circuit for controlling operation of the vacuum pump, the inlet vacuum circuit, the outlet vacuum circuit, the outer cover vacuum circuit and the inlet restrictor fluid circuit, respectively.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
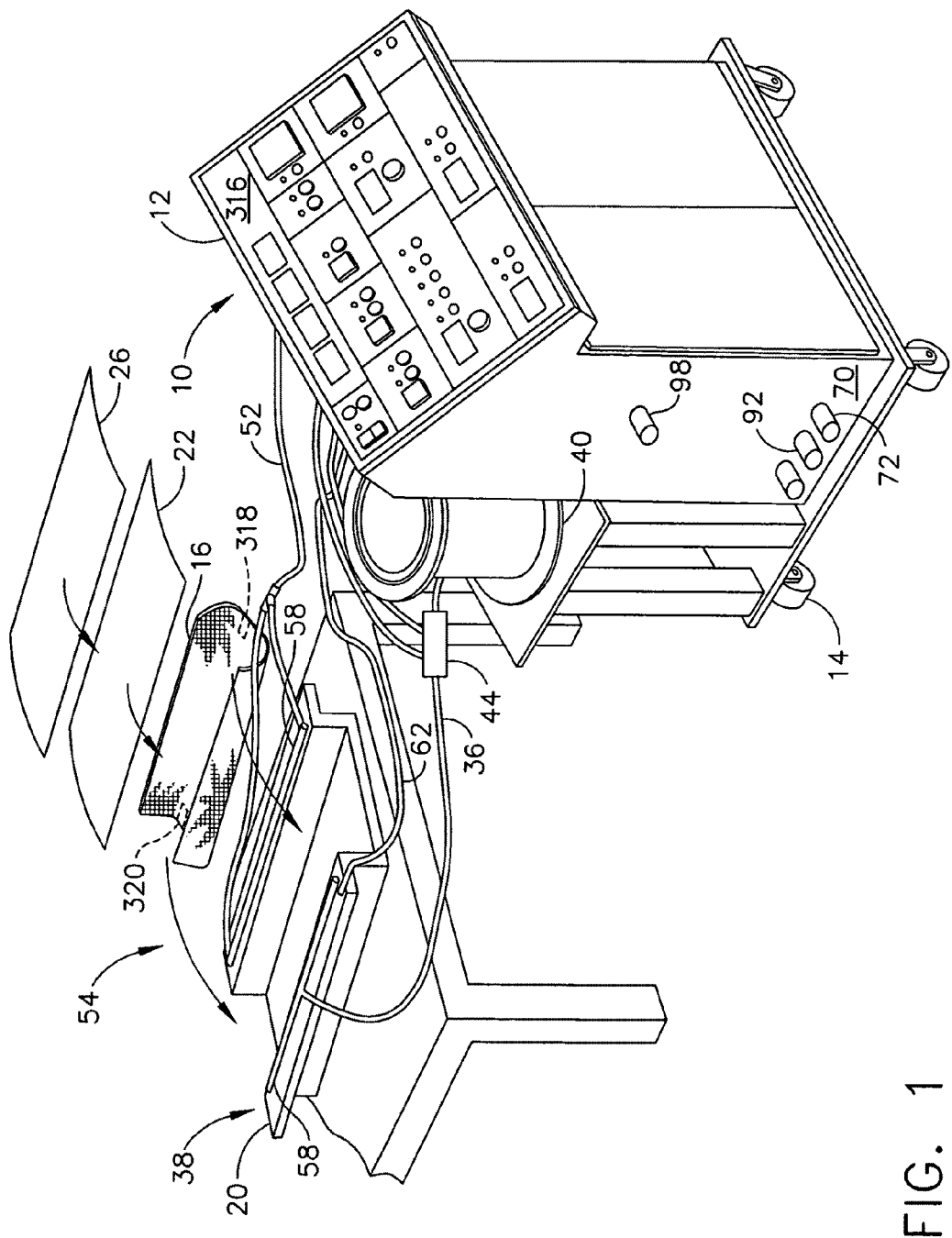
FIG. 1 is a perspective of apparatus according to the present invention shown in combination with a part and components used to infuse the part with resin.
Figure 1A:
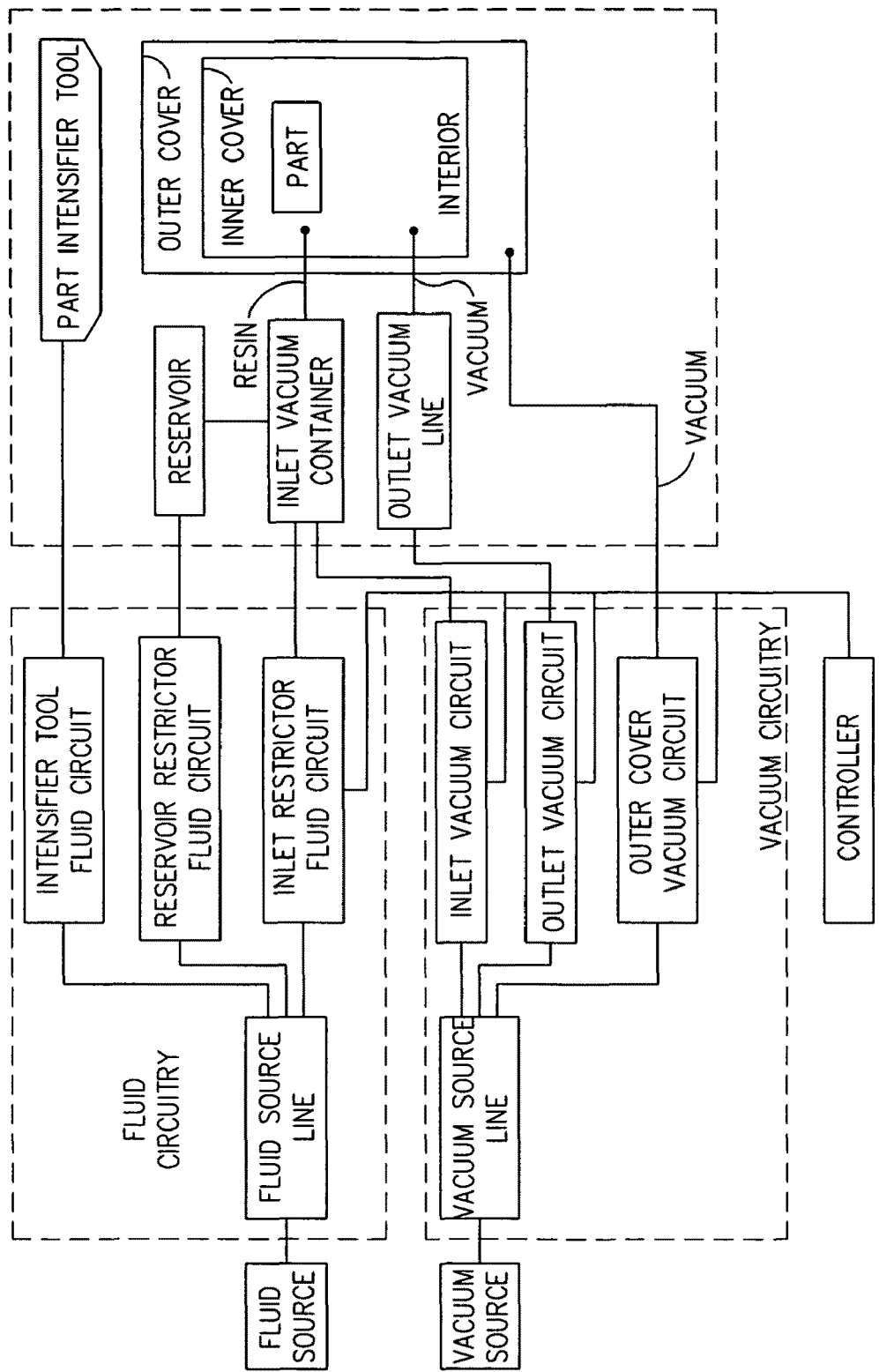
FIG. 1A is a block diagram of the apparatus in combination with the part and components used to infuse the part with resin.
Figure 2:
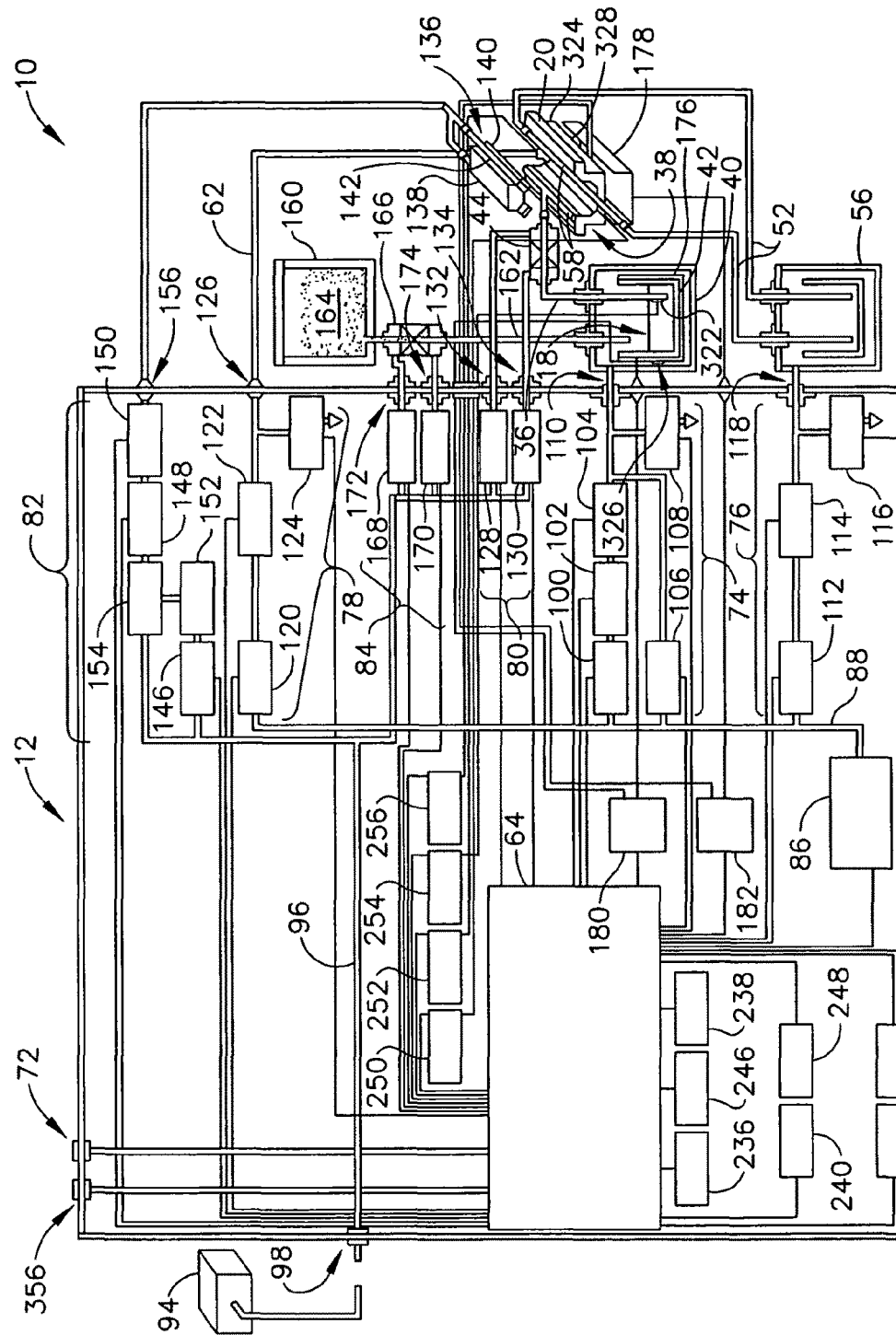
FIG. 2 is a schematic of the apparatus in combination with components used to infuse the part with resin.
Figure 3:
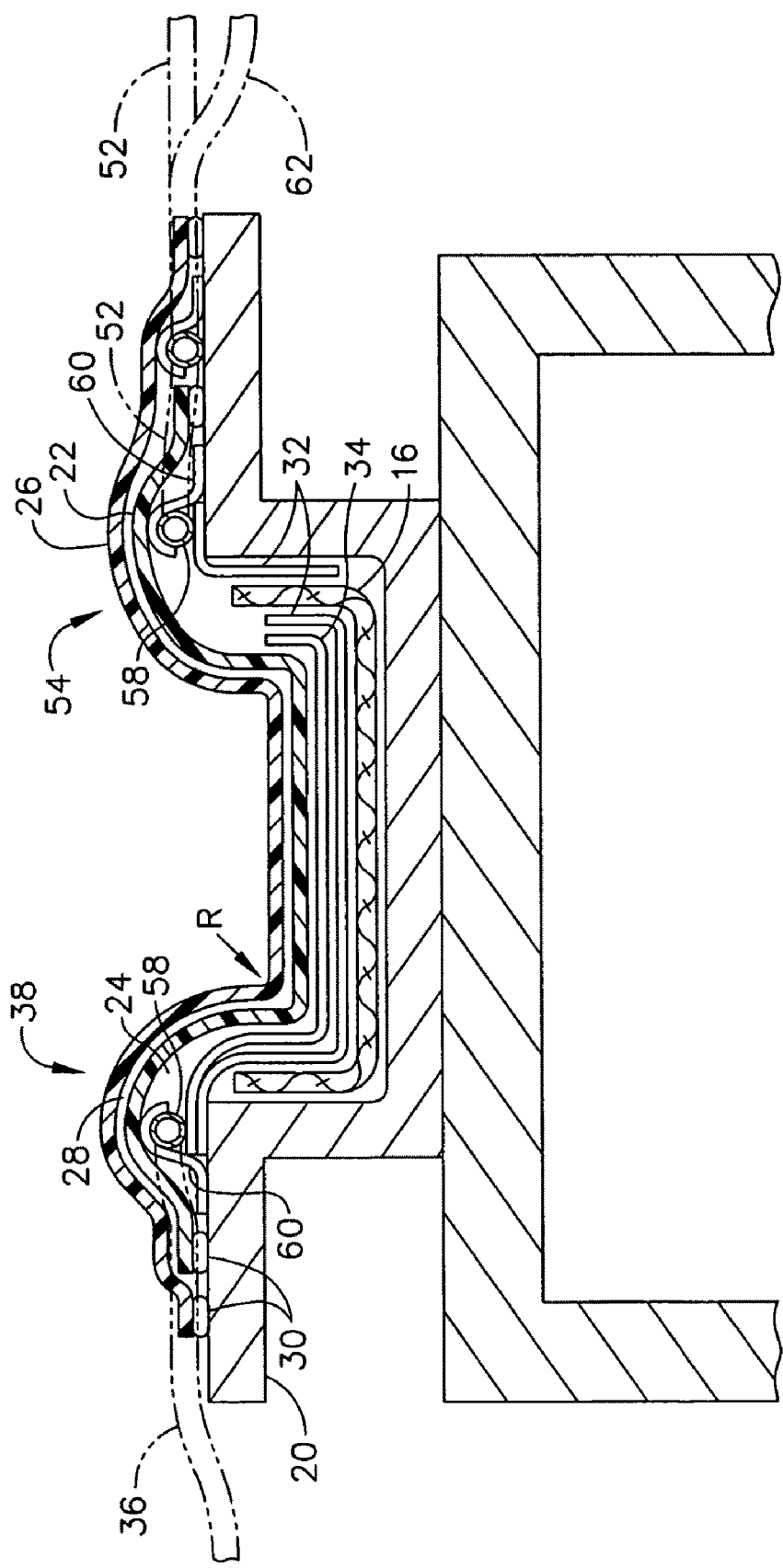
FIG. 3 is a cross section of the part and components used in combination with the apparatus.

Referring to the figures and more particularly to FIG. 1, a resin infusing apparatus according to a first embodiment of the present invention is designated in its entirety by reference number 10. Although the apparatus 10 is described with respect to resin infusion, the apparatus may infuse a part with other materials. The apparatus 10 comprises a body 12 adapted to hold other apparatus components. The body 12 may stand on wheels or casters 14 to facilitate movement of the apparatus 10. The apparatus 10 may comprise one or multiple bodies 12 without departing from the scope of the present invention. The apparatus 10 is used in a process for infusing a fibrous or porous pre-form or part 16 with resin 18 (shown in FIG. 2) to form a consolidated composite laminate part (not shown). Although the apparatus 10 is described with respect resin infusion, it may be used to infuse a part 16 with other materials without departing from the scope of the present invention. Although the part 16 may be made of other materials without departing from the scope of the present invention, in one embodiment the part is made of a woven or braided graphite fabric available from A & P Technology of Cincinnati, Ohio. The apparatus 10 can be used to infuse resin 18 into parts 16 having some pre-existing resin and with, so-called, dry pre-forms, having no resin prior to being infused using the apparatus. The apparatus 10 is used in combination with a part support 20 adapted for supporting the part 16. The part support 20 has a shape corresponding to a desired shape for the resulting laminate part. For example, the part support 20 in FIGS. 1 and 3 has a C-channel shape. As shown in FIGS. 2 and 3, an inner bag or cover 22 is secured to the part support 20 to define with the support a sealed inner cover interior 24 enclosing the part 16 during the resin infusion process. An outer bag or cover 26 is secured to the part support 20 for enclosing the inner cover 22 and the part 16 in an outer cover interior 28. In one embodiment, the covers 22, 26 are preferably transparent or translucent to allow a user to see underlying objects and the resin 18 as it moves through the part 16. Although the covers 22, 26 may be made of other materials without departing from the scope of the present invention, in one embodiment the covers are made of nylon. In one embodiment (not shown), the covers 22, 26 have small dimples on one side and bubbles on the other side placed dimple-side up and bubble-side down during use. Although the covers 22, 26 may have other thicknesses without departing from the scope of the present invention, in one embodiment the covers each have a thickness of about 0.003 inches. The covers 22, 26 may be secured to the part support 20 by way of an adhesive 30 such as a conventional vacuum bag sealing tape. For example, in one embodiment, the covers 22, 26 are secured to the part support 20 by way of double-sided tacky tape or black chromate sealant tape. As shown in FIG. 3, resin transfer media 32, 34 may be selectively disposed adjacent the part 16 to facilitate the flow of resin 18 through the part.

Figure 4:
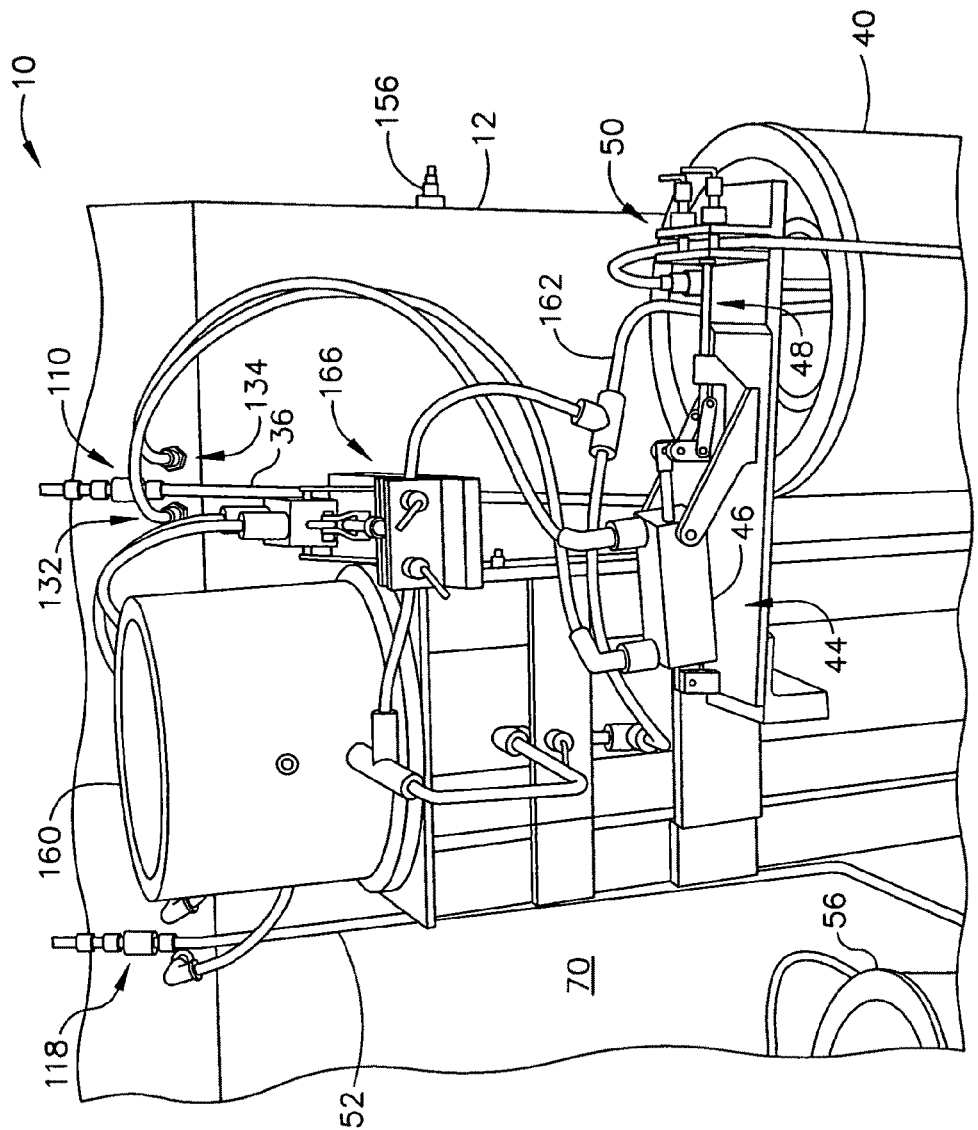
FIG. 4 is a perspective of an exterior rear of the apparatus in combination with components used in the infusion process.

The apparatus 10 is also used in combination with an inlet vacuum line 36 that is operatively connected to the inner cover interior 24 adjacent an inlet side 38 of the interior and part. As shown in FIGS. 1 and 2, the inlet vacuum line 36 includes an inlet vacuum container 40 for holding resin 18 during the infusion process. In one embodiment, a canister 42 holding the resin 18 is placed in the inlet vacuum container 40 during the infusion process. The inlet vacuum line 36 also includes an inlet pinch valve or restrictor 44 operatively connected to the inlet vacuum container 40 for selectively allowing and restricting flow through the inlet vacuum container. Although the inlet restrictor 44 may be other types without departing from the scope of the present invention, in one embodiment the restrictor is manufactured by the Boeing Company, of Chicago, Ill., using a pneumatic actuator from DE-STA-CO Industries of Madison Heights, Mich. As shown in FIG. 4, the restrictor 44 may include a pneumatic valve 46 having an extension 48 that may be extended to collapse the inlet vacuum line 36 against a bracket 50 thereby restricting flow through the inlet vacuum line.

The apparatus 10 is further used in combination with an outlet vacuum line 52. As shown in FIG. 3, the outlet vacuum line 52 is operatively connected to the inner cover interior 24 adjacent an outlet side 54 of the inner cover interior and part 16 that is generally opposite the inlet side 38. In one embodiment, the vacuum lines 36, 52 are transparent or translucent so a user can see resin 18 moving through them. The outlet vacuum line 52 may include an outlet vacuum container 56. During a resin 18 infusing step of the infusion process, the inlet vacuum line 36 and outlet vacuum line 52 pull different amounts of vacuum in the inner cover interior 24 to create a pressure differential thereby drawing resin 18 from the inlet vacuum container 40 to the inner cover interior and through the part 16. The outlet vacuum line 52 may include a pinch valve or restrictor (not shown) operatively connected to the outlet vacuum line for selectively allowing and restricting flow through the outlet vacuum line.

As shown in FIGS. 1-3, the inlet and outlet vacuum lines 36, 52 may include delivery arms 58 extending along the inlet side 38 and outlet side 54 of the interior 24 and part 16. In one embodiment, the delivery arms 58 are transparent or translucent to allow a user to see resin 18 moving through them. The delivery arms 58 facilitate distribution of resin 18 across the part 16. The delivery arms 58 may be made of spiral nylon tubing or other elongate porous conduit that allows resin 18 to pass along its length and through its sides to the part 16. In one embodiment, the delivery arms 58 are made of tubing having an inner diameter of between about ⅛ inch and about ⅜ inch. In one embodiment, the delivery arms 58 connected to the outlet vacuum line 52 are smaller than the delivery arms connected to the inlet vacuum line 36. The delivery arms 58 may be connected to the part 16, to the part support 20 and/or to the resin transfer media 32, 34. Although the delivery arms 58 may be connected to the part 16, the part support 20 and/or resin transfer media 32, 34 by other means without departing from the scope of the present invention, in one embodiment they are connected by way of tape 60. The vacuum lines 36, 52 may be connected to the delivery arms 58 in various fashions. For example, the vacuum lines 36, 52 may be connected to the delivery arms 58 at a central portion of the corresponding arm, as shown in FIG. 1 for the inlet vacuum line, or at an end portion of the corresponding arm, as shown in FIG. 1 for the outlet vacuum line.

The apparatus 10 is further used in combination with an outer cover vacuum line 62. As shown in FIG. 3, the outer cover vacuum line 62 is operatively connected to the outer cover interior 28 for introducing a vacuum to the outer cover interior during the infusion process. The outer cover vacuum line 62 may include delivery arms (not shown), similar to the delivery arms 58 described with respect to the inlet and outlet vacuum lines 36, 52.

Figure 5:
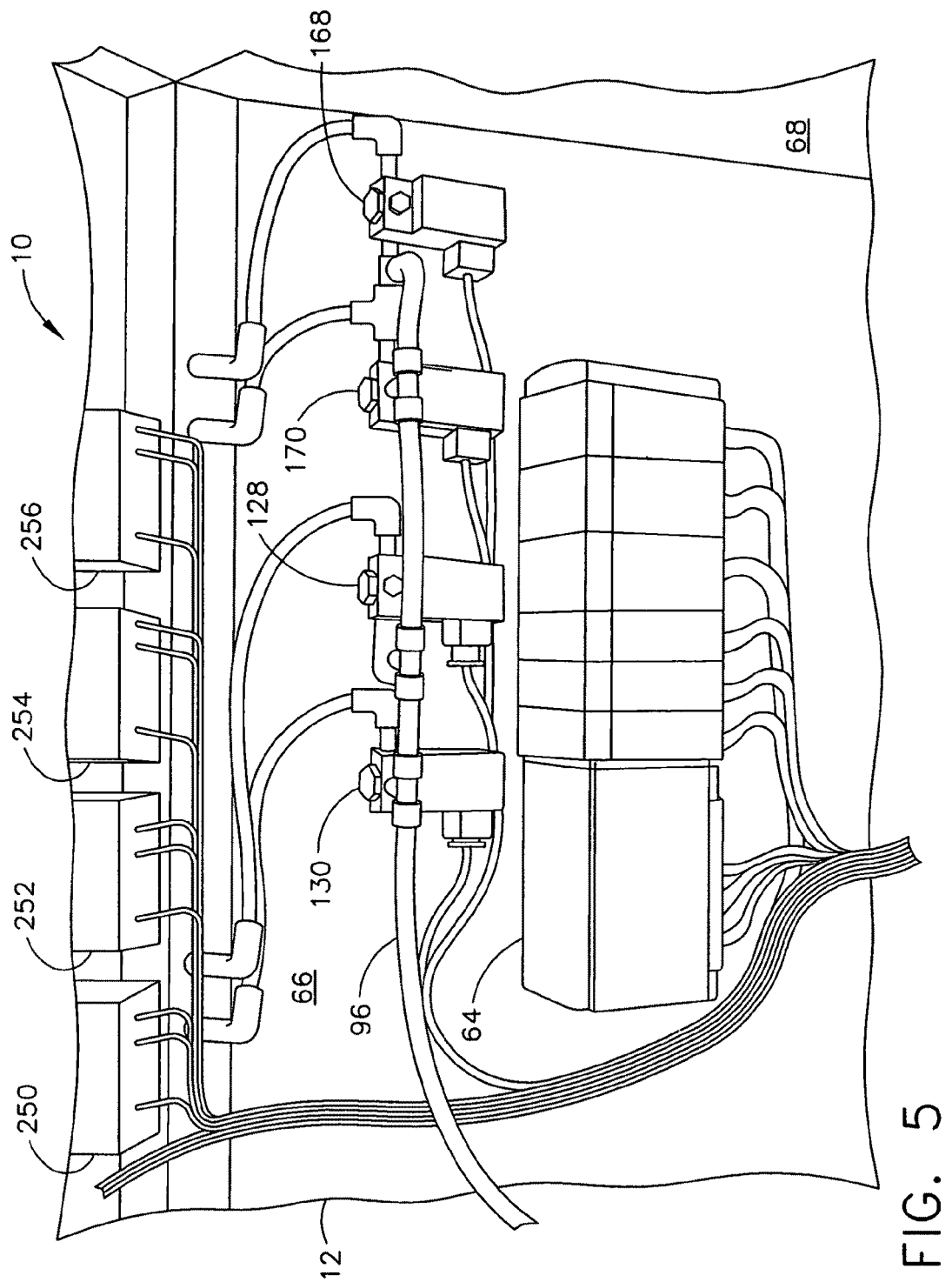
FIG. 5 is a perspective of an interior back wall of the apparatus.
Figure 6:
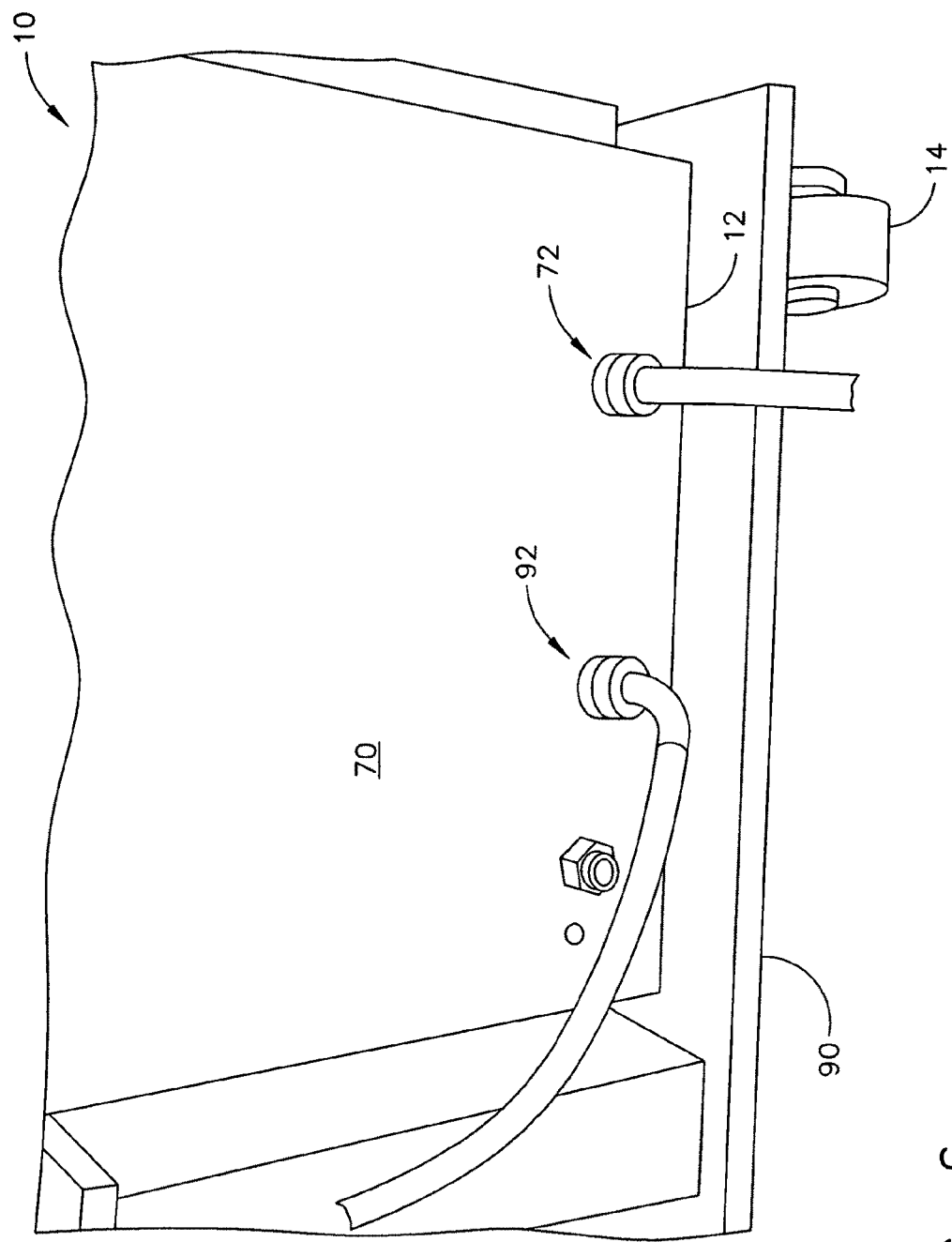
FIG. 6 is a detail perspective of a lower portion of a left exterior side of the apparatus.
Figure 7:
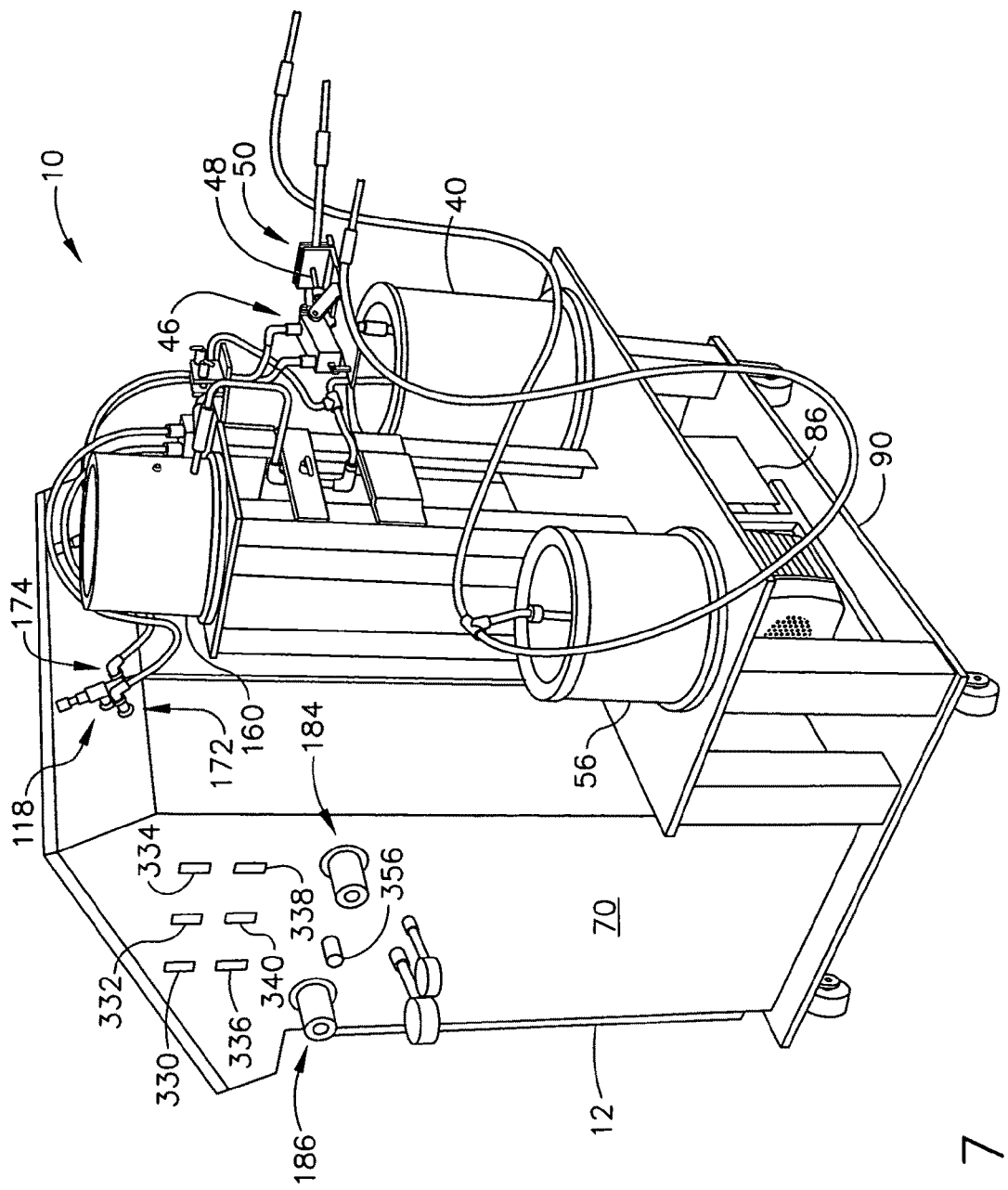
FIG. 7 is a perspective of the apparatus in combination with components used in the infusion process.

FIG. 5 shows an apparatus controller 64 mounted on a back inside surface 66 of the apparatus body 12. Apparatus 10 components, such as the controller 64, may be mounted on the body 12 in various ways and at various locations without departing from the scope of the present invention. For example, in one embodiment (not shown), the controller 64 is mounted on a right inside surface 68 or an outside surface 70 of the body 12. Although the controller 64 may be other types without departing from the scope of the present invention, in one embodiment the controller is a Micro Logix 1500, available from Allen-Bradley of Milwaukee, Wis. In one embodiment, the controller 64 is connected to an external power source (not shown) through a controller power port 72 (shown in FIGS. 1 and 6). In one embodiment, the controller 64 requires connection to a 120 volt/30 amp electric power source. As shown in FIG. 2, the apparatus 10 comprises an inlet vacuum circuit 74, an outlet vacuum circuit 76 and an outer cover vacuum circuit 78 operatively connected to the controller 64 so the controller can control operation of the inlet vacuum circuit, the outlet vacuum circuit and the outer cover vacuum circuit, respectively. The apparatus 10 further comprises an inlet restrictor fluid circuit 80, an intensifier tool fluid circuit 82 and a reservoir restrictor fluid circuit 84 operatively connected to the controller 64 so the controller can control operation of each of these circuits. Each vacuum circuit 74, 76, 78 is in fluid communication with a vacuum source 86 by way of a vacuum source line 88 adapted for connecting to the vacuum source. The vacuum source 86 selectively introduces a vacuum to each of the vacuum circuits 74, 76, 78 by way of the vacuum source line 88 during operation of the apparatus 10. The vacuum source 86 may be operatively connected to the controller 64 so the controller can control operation of the vacuum source. The vacuum source 86 may be mounted on the body 12, such as on an exterior shelf 90 of the body 12, as shown in FIG. 7. Although the vacuum source 86 may be other types without departing from the scope of the present invention, in one embodiment the vacuum source is a Pascal 2021 SD vacuum pump available from Alcatel Vacuum Products, Inc. of Hingham, Mass. In one embodiment, the vacuum source 86 is connected to an external power source (not shown) through a vacuum source power port 92 (shown in FIGS. 1 and 6). In one embodiment, the vacuum source 86 requires connection to a 120 volt/30 amp electric power source and is able to pull a vacuum of about 30 inches Hg. Vacuum sources cannot pull a perfect vacuum (about 29.92 inches Hg) and the maximum vacuum pulled by a source depends on variables including the local atmospheric pressure. In one embodiment (not shown), the vacuum source 86 is external to the apparatus 10.

Figure 8:
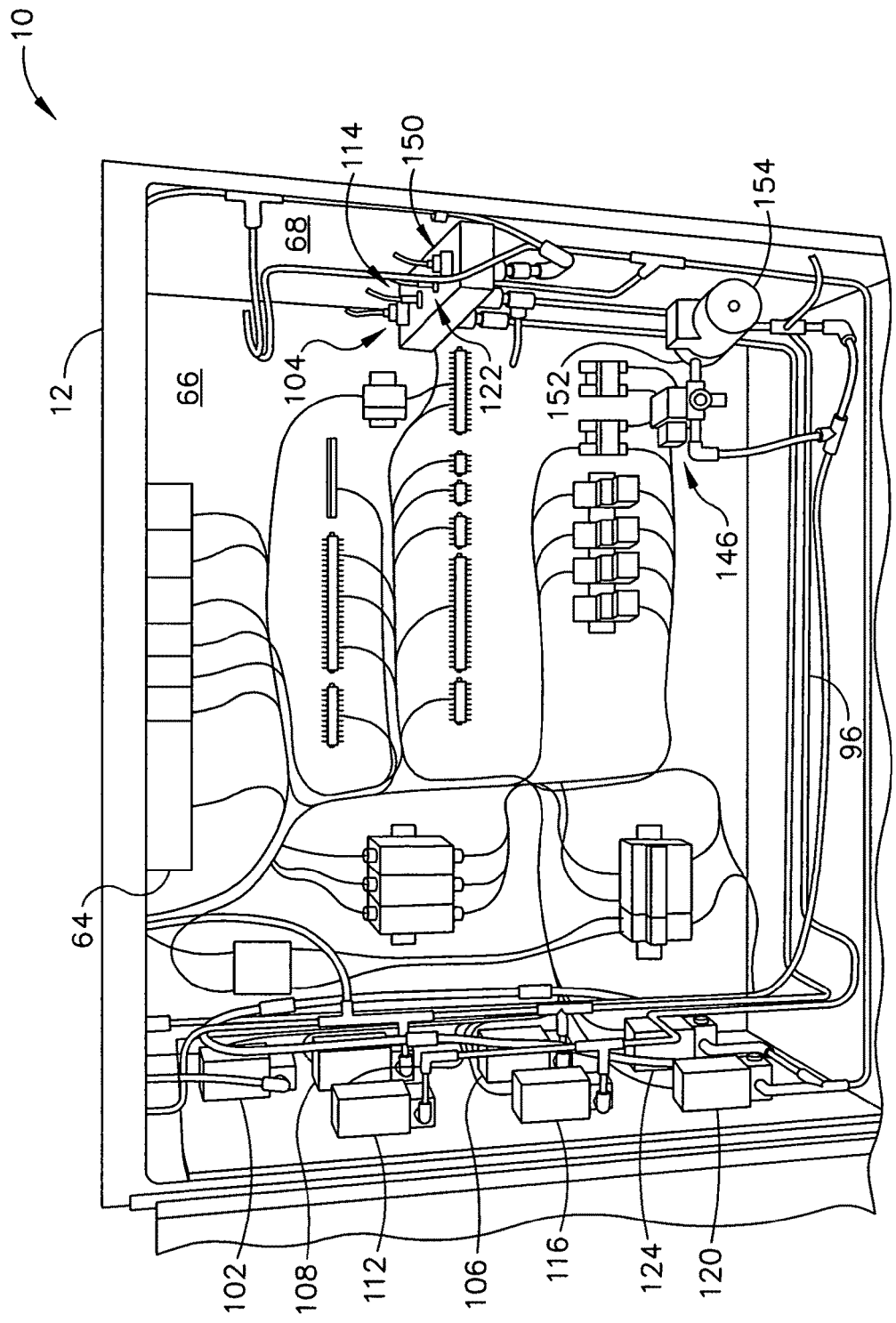
FIG. 8 is a perspective of the interior of the apparatus.

As shown in FIGS. 2 and 5, each fluid circuit 80, 82, 84 is in fluid communication with a pressurized fluid source 94 by way of a pressurized fluid source line 96 mounted on the body 12 and adapted for connecting to the pressurized fluid source. Although other fluids may be introduced to the pressurized fluid source line 96 from the pressurized fluid source 94 without departing from the scope of the present invention, in one embodiment the fluid is air. In one embodiment, the pressurized fluid source line 96 is connected to a pressurized fluid source 94 capable of providing fluid at a pressure of between about 100 psi and about 120 psi. The pressurized fluid source 94 may be mounted on the body 12 or, as shown in FIG. 2, may be external to the body 12. External pressurized fluid sources 94 are common in manufacturing environments, being used to operate, for example, air motors and air ratchet wrenches. As shown in FIGS. 2 and 8, the apparatus may comprise a pressurized fluid port 98 mounted on the body 12 for connecting the pressurized fluid source 94 to the pressurized fluid source line 96 for selectively introducing pressurized fluid to the pressurized fluid source line.

Figure 10:
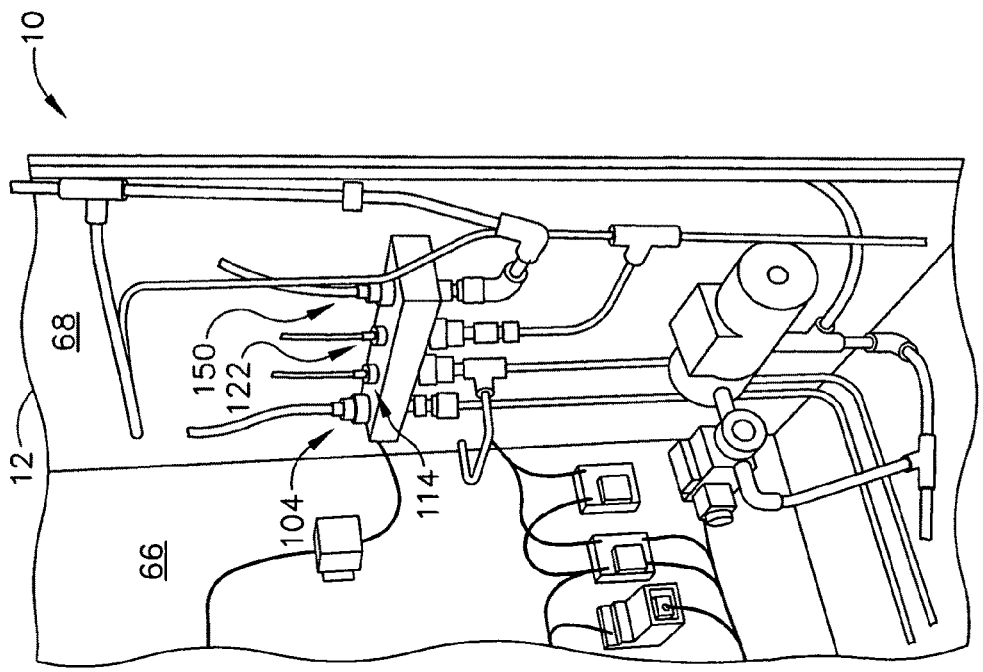
FIG. 10 is a perspective of a right interior wall of the apparatus according to the first embodiment of the present invention.
Figure 11:
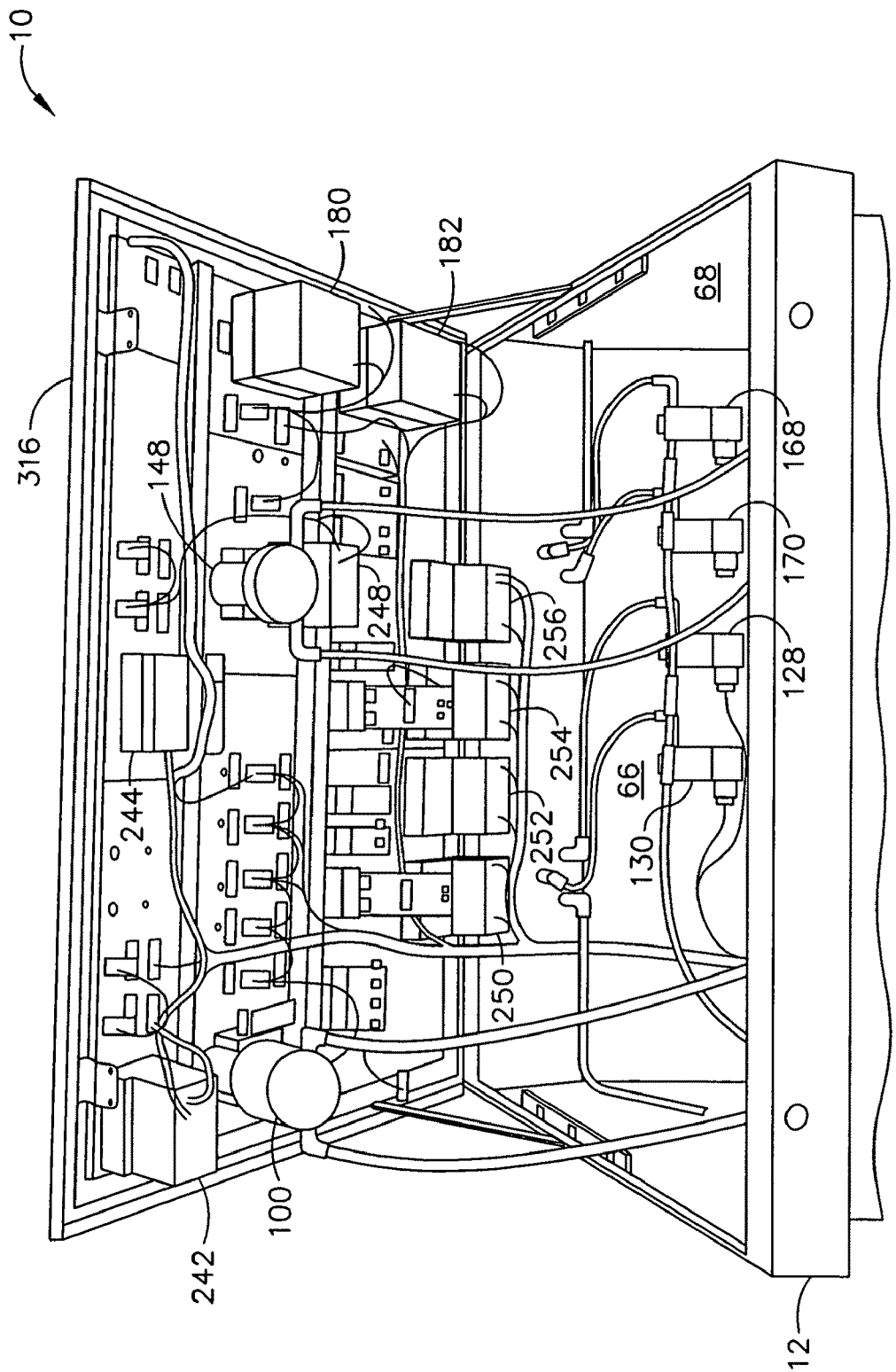
FIG. 11 is a perspective of a top of the interior of the apparatus.
Figure 12:
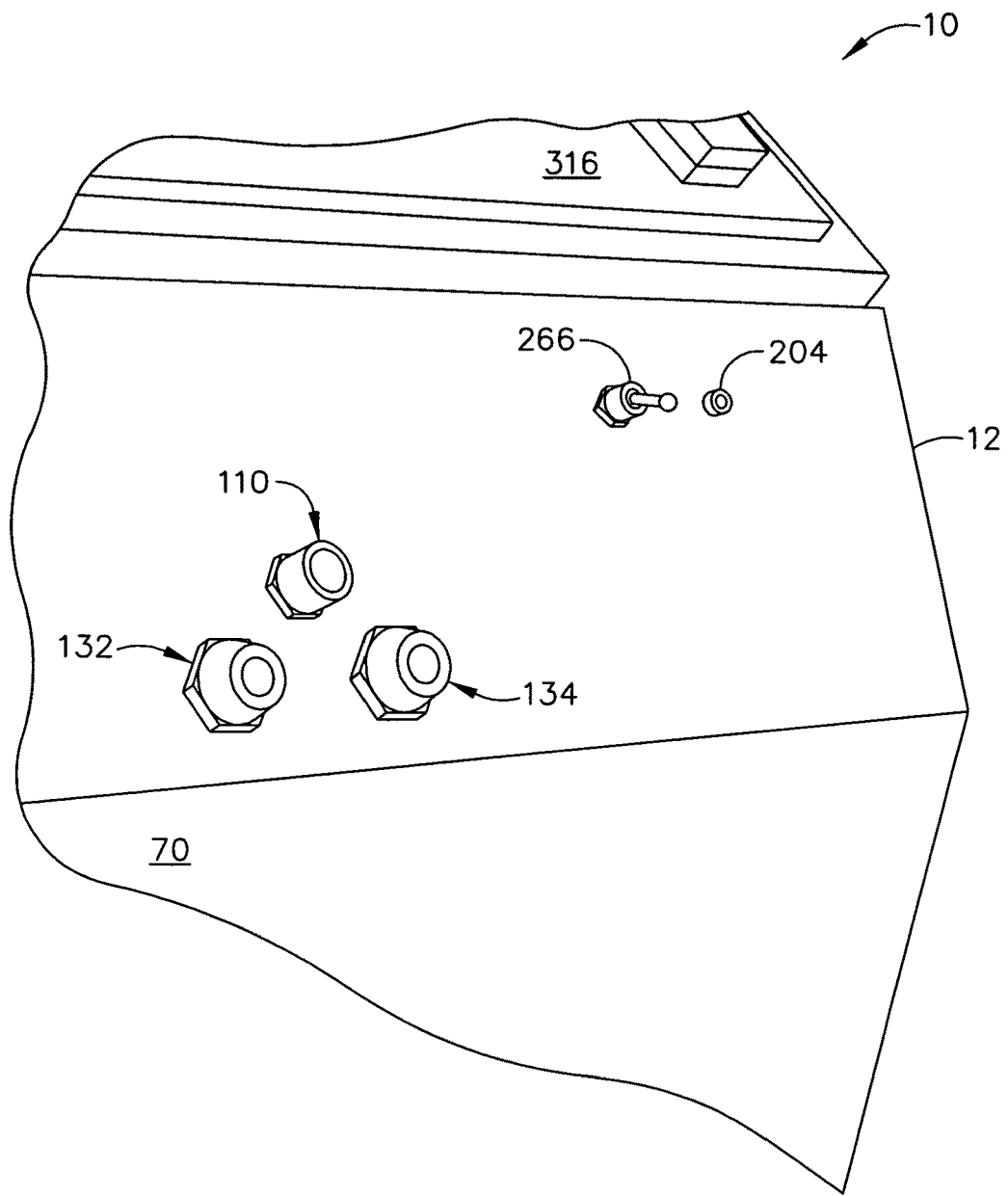
FIG. 12 is a close-up perspective of an upper right corner of the exterior rear of the apparatus.

As shown in FIG. 2, the inlet vacuum circuit 74 includes a first sub-circuit having a regulator 100, a regulated inlet valve 102 and an inlet vacuum circuit transducer 104. The inlet vacuum circuit 74 also includes a second sub-circuit in parallel with the first sub-circuit having an unregulated inlet valve 106 and an inlet vent valve 108. Although the valves 102, 106, 108 may be other types without departing from the scope of the present invention, in one embodiment each valve is a conventional electrically actuated ball lock valve such as a Model 225B-111CAAA valve available from MAC Valves, Inc. of Wixom, Mich. The inlet regulator 100 regulates vacuum in the inlet vacuum circuit 74 when less than the full vacuum-producing capacity of the vacuum source 86 is needed downstream from the inlet vacuum circuit. For example, if the vacuum source 86 produces a maximum vacuum of about 28 inches Hg, the controller 64 may control the regulator 100 so a vacuum of only about 15 inches Hg is pulled in the inlet vacuum container 40 by the inlet vacuum circuit 74. Although the inlet regulator 100 may be other types without departing from the scope of the present invention, in one embodiment the inlet regulator is a number 16213 regulator available from Fairchild Industrial Products Co. of Winston-Salem, N.C. The inlet circuit transducer 104 measures fluid pressure in the first sub-circuit of the inlet vacuum circuit 74. Although the transducer 104 may be other types without departing from the scope of the present invention, in one embodiment the transducer is a Model 425H3-01-A transducer available from Barksdale, Inc. of Los Angeles, Calif. As shown in FIGS. 5 and 8-11, the inlet vacuum circuit 74, including inlet circuit components 100, 102, 104, 106, 108, is mounted on the body 12. As shown in FIGS. 2, 4 and 12, the apparatus 10 further comprises an inlet vacuum port 110 mounted on the body 12 for connecting the inlet vacuum circuit 74 to the inlet vacuum container 40 for selectively introducing a vacuum to the inlet vacuum container.

Figure 9:
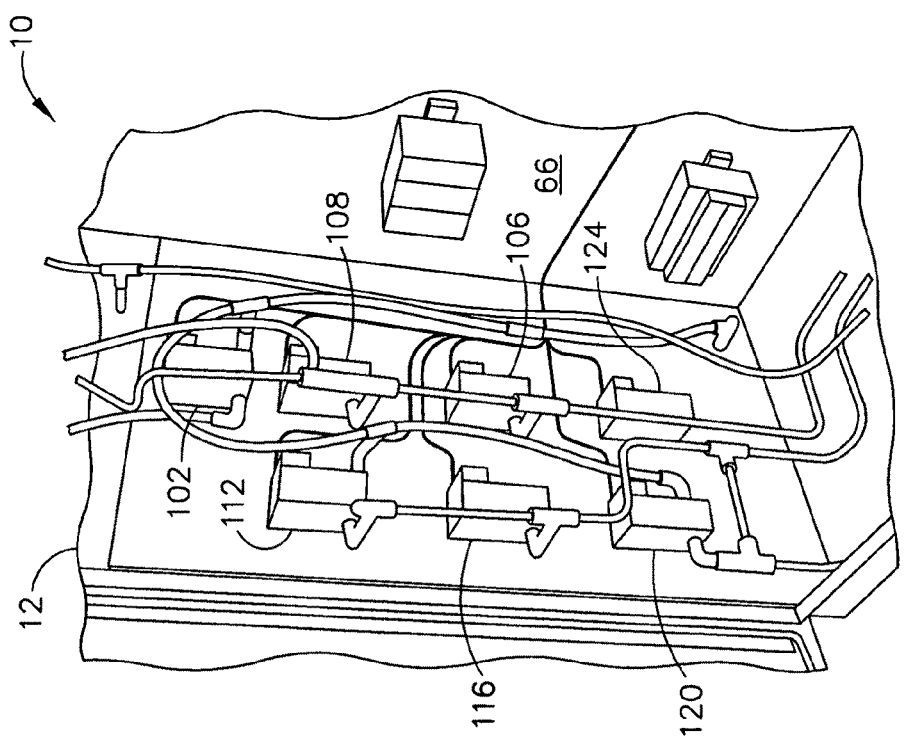
FIG. 9 is a perspective of a left interior wall of the apparatus.

As shown in FIG. 2, the outlet vacuum circuit 76 includes an outlet vacuum circuit valve 112, an outlet vacuum circuit transducer 114 and an outlet vent valve 116. The valves 112, 116 may any type of valve described above regarding the inlet vacuum circuit 74. The outlet transducer 114 measures fluid pressure in the outlet vacuum circuit 76 and may be any type of transducer described above. An outlet regulator (not shown) may be included in the outlet vacuum circuit 76 to regulate vacuum in the outlet vacuum circuit when less than the full vacuum-producing capacity of the vacuum source 86 is needed downstream from the outlet vacuum circuit. When the outlet vacuum circuit 76 has no regulator, the full vacuum capacity of the vacuum source 86 is introduced to the outlet vacuum line 52 when the outlet vacuum circuit valve 112 is open. As shown in FIGS. 8-10, the outlet vacuum circuit 76, including outlet circuit components 112, 114, 116, is mounted on the body 12. As shown in FIGS. 2, 4, 7 and 13, the apparatus 10 further comprises an outlet vacuum port 118 mounted on the body 12 for connecting the outlet vacuum circuit 76 to the outlet vacuum line 52 for selectively introducing a vacuum to the outlet vacuum line.

Figure 14:
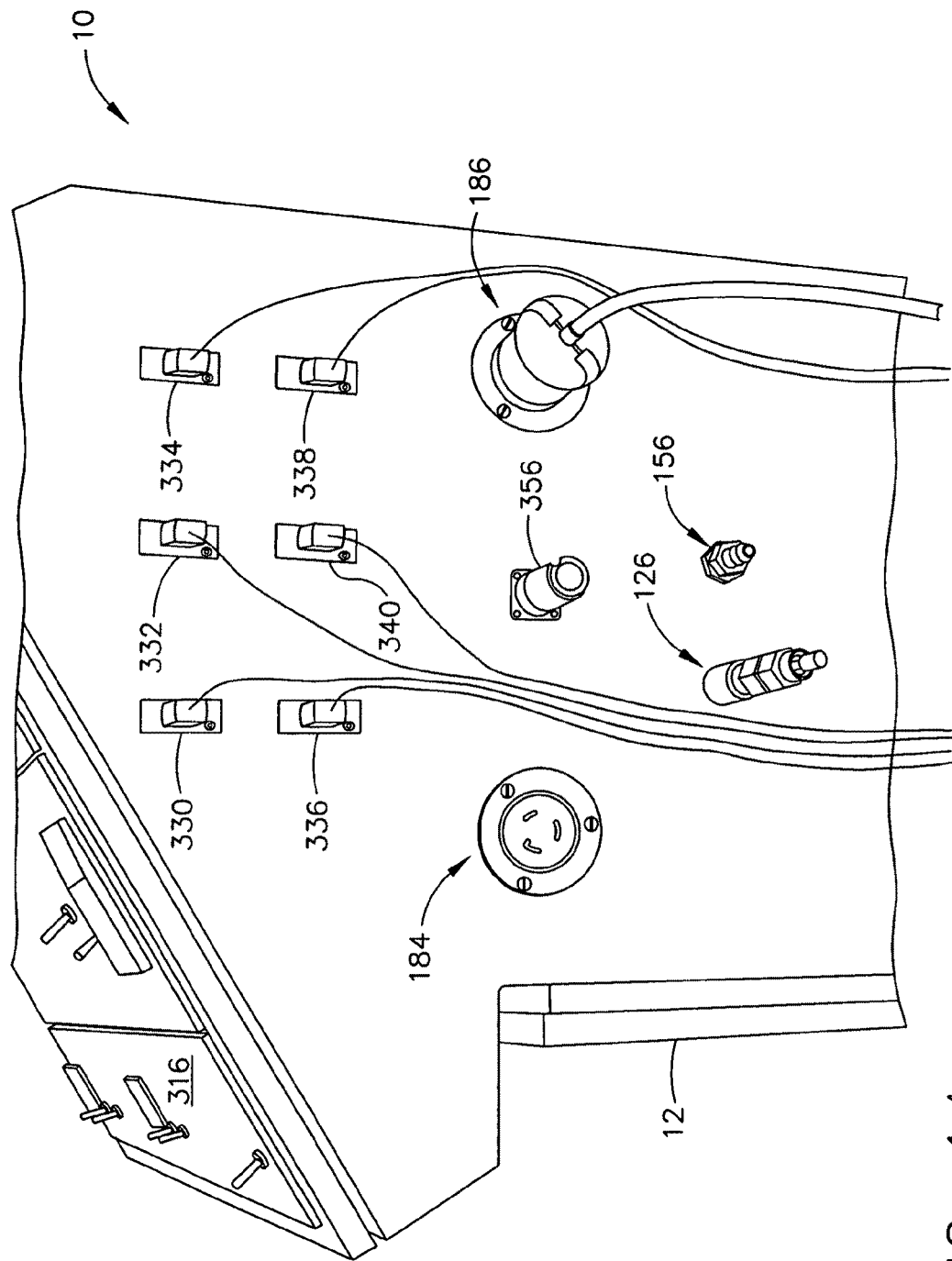
FIG. 14 is a perspective of the right exterior side of the apparatus.

As shown in FIG. 2, the outer cover vacuum circuit 78 includes an outer cover valve 120, an outer cover transducer 122 and an outer cover vent valve 124. The valves 120, 124 may be any type of valve described above. The outer cover transducer 122 measures fluid pressure in the outer cover vacuum circuit 78 and may be any type of transducer described above. An outer cover regulator (not shown) may be included in the outer cover vacuum circuit 78 to regulate fluid pressure in the outer cover vacuum circuit. As shown in FIGS. 8-10, the outer cover vacuum circuit 78, including outer cover components 120, 122, 124, is mounted on the body 12. As shown in FIGS. 2, 7 and 14, the apparatus 10 further comprises an outer cover vacuum port 126 mounted on the body 12 for connecting the outer cover vacuum circuit 78 to the outer cover vacuum line 62 and outer cover 26 for selectively introducing a vacuum to the outer cover.

As shown in FIG. 2, the inlet restrictor fluid circuit 80 includes two inlet restrictor valves 128, 130 connected in parallel and operatively connected to the controller 64 for controlling the inlet restrictor 44. The inlet restrictor valves 128, 130 comprise an extend valve 128 and a retract valve 130. The valves 128, 130 are controlled so that when one of them is open, the other on is closed. The valves 128, 130 may any type of valve described above. It is contemplated that the combination of the valves 128, 130 and inlet restrictor 44 may be replaced by a single inlet restrictor valve (not shown). An inlet restrictor circuit regulator (not shown) may be included in the inlet restrictor fluid circuit 80 to regulate fluid pressure in the inlet restrictor circuit. As shown in FIGS. 5 and 11, the inlet restrictor fluid circuit 80, including inlet restrictor valves 128, 130, is mounted on the body 12. As shown in FIGS. 2, 4 and 12, the apparatus 10 further comprises an extend inlet restrictor port 132 and a retract inlet restrictor port 134 mounted on the body 12 for connecting the inlet restrictor fluid circuit 80 and, specifically the extend inlet valve 128 and the retract inlet valve 130, respectively, to the inlet restrictor 44 for selectively introducing pressurized fluid to the inner cover 22. The inlet restrictor fluid circuit 80 is adapted to selectively permit and restrict flow between the inlet vacuum container 40 and the inner cover interior 24.

Figure 15A:
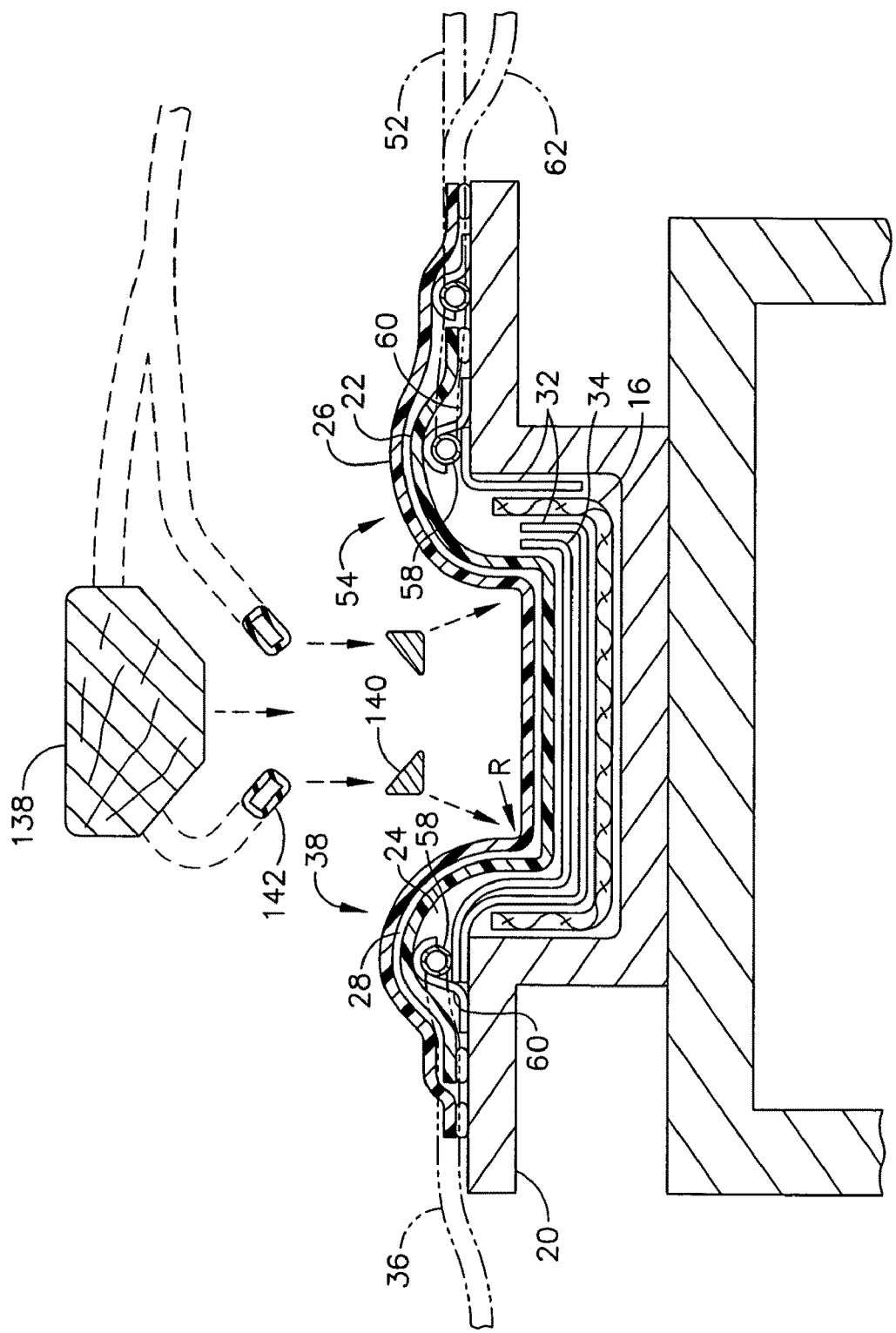
FIG. 15A is a cross section of the part and components shown in FIG. 1 in combination with a compaction tool for positioning over the part.
Figure 15B:
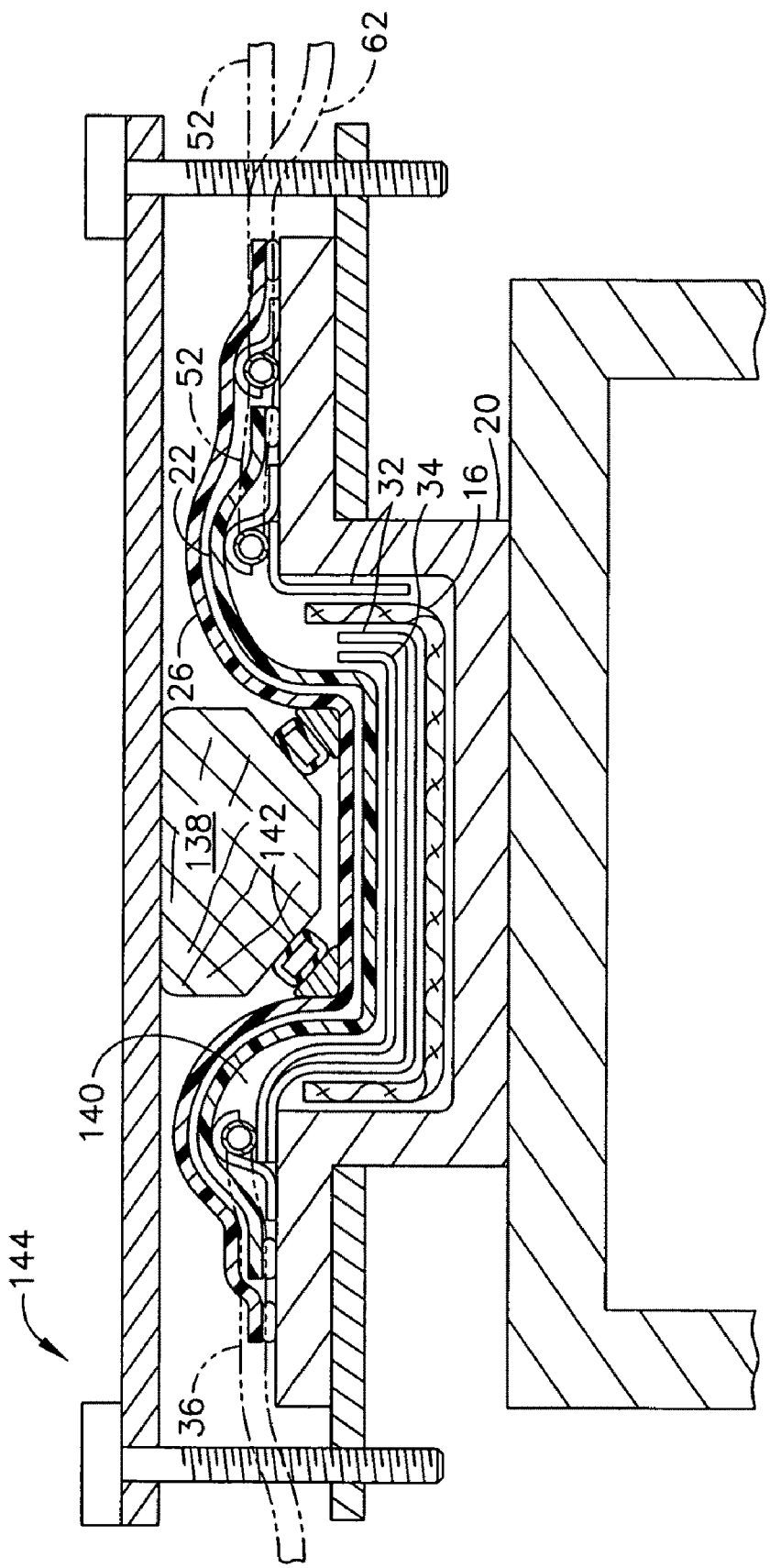
FIG. 15B is a cross section of the part and components shown in FIG. 15A with the compaction tool lowered onto the part.

The apparatus 10 may be adapted for use in combination with a compaction intensifier tool 136 having a shape corresponding to a shape of the part 16 and part support 20. Various types of intensifier tools 136 can be used without departing from the scope of the present invention. As shown in FIGS. 2, 15A and 15B, the intensifier tool 136 may include a block 138 and intensifier details 140 having shapes corresponding to the shape of the part 16. Although the block 138 may be made of various materials without departing from the scope of the present invention, in one embodiment the block is made of a substantially rigid material, such as wood. The intensifier details 140 may be made of Teflon® polymer or other materials without departing from the scope of the present invention. Teflon is a federally registered trademark of E.I. Du Pont De Nemours and Company Corporation of Wilmington, Del. The intensifier tool 136 of this embodiment also includes expanders 142 positioned between the block 138 and the intensifier details 140 for use in an impacting step of the infusion process. The expanders 142 can be selectively inflated and deflated to push the intensifier details 140 into the part and to relieve the force applied to the intensifier details 140 during the intensifying step. The tool 136 of this embodiment also includes braces or clamps 144 (shown in FIG. 15B) for holding the block 138 in place while the expanders 142 push against the block and intensifier details 140 as they expand.

As shown in FIG. 2, the intensifier tool fluid circuit 82 is in fluid communication with the pressurized fluid source 94 by way of the pressurized fluid source line 96. The intensifier tool fluid circuit 82 is operatively connected to the controller 64, which controls operation of the intensifier tool fluid circuit. The intensifier tool fluid circuit 82 is operatively connectable to the compaction intensifier tool 136 for selectively introducing pressurized fluid to the tool. The intensifier tool fluid circuit 82 includes an intensifier tool valve 146, a fluid pressure regulator 148 and a transducer 150. The intensifier tool valve 146 and regulator 148 may be any of the valve and regulator types described above. In one embodiment, the regulator 148 is able to regulate a high-pressure flow from the pressurized fluid source 94 having a pressure of between about 100 psi and about 120 psi down to a target intensification pressure of between about 50 psi and about 70 psi. As shown in FIG. 2, the intensifier tool fluid circuit 82 may also include a pneumatic motor 152 and a pneumatic valve 154. The intensifier tool valve 146 is operatively connected to the controller 64, which controls fluid flow through the intensifier tool fluid circuit 82 by controlling the intensifier tool valve. In one embodiment, the pneumatic valve 154 is a three-way valve, having an open position, a closed position and a vent position, such as a SS-44XS6-53S valve available from SwageLok Company of Solon, Ohio. A three-way pneumatic valve 154 allows pressurize/depressurize cycling of the intensifier tool fluid circuit 82 for sequentially pressuring and releasing the expanders 142. As will be appreciated by those skilled in the art, the combination of the intensifier tool valve 146, the motor 152 and the pneumatic valve 154, as shown in FIG. 2, may be replaced by a combination of a primary flow valve and a vent valve (not shown) serially connected with the intensifier tool fluid pressure regulator 148 and transducer 150, which would also allow selective cycling of the intensifier tool fluid circuit 82. The fluid pressure circuit transducer 150 measures pressure in the intensifier tool fluid circuit 82. As shown in FIGS. 8, 10 and 11, the intensifier tool fluid circuit 82, including intensifier tool fluid circuit components 146, 148, 150, 152, 154 is mounted on the body 12. The controller 64 is operatively connected to each component 146, 148, 150, 152, 154 of the intensifier tool fluid circuit 82 for controlling operation of the respective components. As shown in FIGS. 2, 4 and 14, the apparatus 10 further comprises an intensifier tool circuit port 156 mounted on the body 12 for connecting the intensifier tool fluid circuit 82 to the intensifier tool 136. For infusion parts 158 (shown in FIG. 16) having no corners or radii R to intensify, the intensifier tool 136 is not needed. However, a compaction intensifier tool (not shown) having a planar surface corresponding to a planar surface of the part 158 and corresponding part support 342 (shown in FIG. 16) may be used in combination with the present apparatus 10 during part compaction.

As shown in FIGS. 2, 4 and 7, the apparatus 10 may be adapted for use in combination with a reservoir 160. The reservoir 160 is operatively connected to the inlet vacuum container 40 by a material delivery line 162 for selectively delivering material 164 (shown in FIG. 2) to the inlet vacuum container for mixing with the resin 18 in the container during the infusion process. In one embodiment, the material 164 is water. The apparatus 10 is further used in combination with a material delivery line pinch valve or restrictor 166 operatively connected to the material delivery line 162 for controlling an amount of material 164 delivered to the inlet vacuum container 40 from the reservoir 160. The material delivery line restrictor 166 may be any type of valves or restrictor described above.

Figure 13:
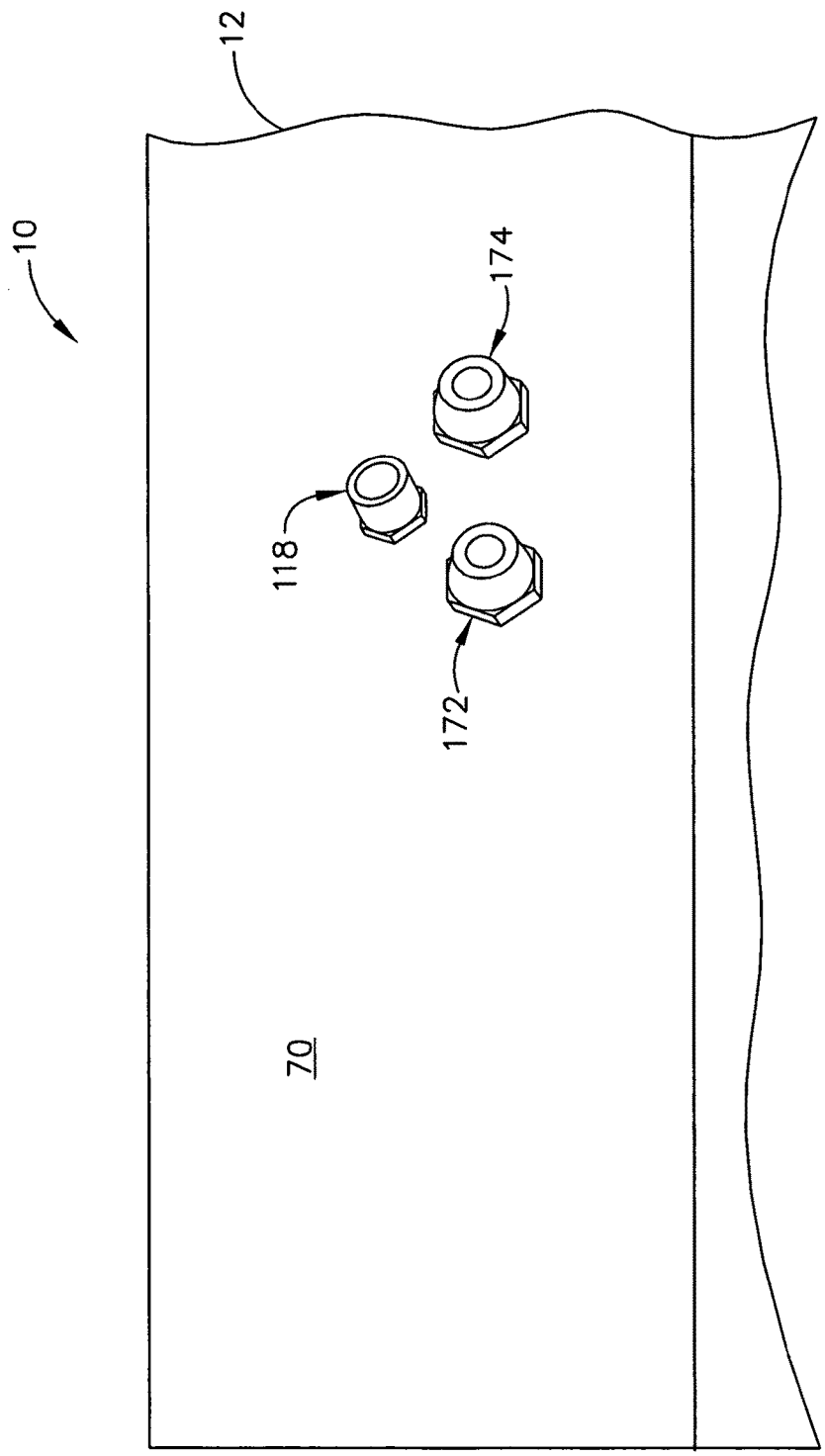
FIG. 13 is a close-up perspective of an upper central portion of the exterior rear of the apparatus.

As shown in FIG. 2, the reservoir restrictor fluid circuit 84 is in fluid communication with the pressurized fluid source line 96. The reservoir restrictor fluid circuit 84 is operatively connected to the controller 64 and operatively connectable to the material delivery line restrictor 166 for selectively introducing pressurized fluid to the material delivery line restrictor to control the restrictor. The reservoir restrictor fluid circuit 84 includes two reservoir valves 168, 170 connected in parallel between the pressurized fluid source 94 and the material delivery line restrictor 166 It is contemplated that the combination of the valves 168, 170 and the material delivery line restrictor 166 may be replaced by a single material delivery line restrictor valve (not shown). The reservoir valves 168, 170 comprise an extend reservoir valve 168 and a retract reservoir valve 170. The reservoir valves 168, 170 are controlled so that when one of the valves is open, the other is closed. As shown in FIGS. 5 and 11, the reservoir restrictor fluid circuit 84, including the reservoir restrictor fluid circuit valves 168, 170, is mounted on the body 12. The controller 64 is operatively connected to each component 168, 170 of the reservoir restrictor fluid circuit 84 for controlling operation of each component. As shown in FIGS. 2, 7 and 13, the apparatus 10 further comprises an extend reservoir restrictor port 172 and a retract reservoir restrictor port 174 mounted on the body 12 for connecting the reservoir restrictor fluid circuit 84, and specifically the extend reservoir valve 168 and the retract reservoir valve 170, respectively, to the material delivery line restrictor 166 for selectively introducing pressurized fluid to the reservoir restrictor to control the restrictor. The reservoir restrictor fluid circuit 84 is adapted to selectively permit and restrict flow between the reservoir 160 and the inlet vacuum container 40.

As shown in FIG. 2, the apparatus 10 may be adapted for use in combination with an inlet vacuum container heating device 176 and a part support heating device 178. The inlet vacuum container heating device 176 is positioned adjacent or within the inlet vacuum container 40 for heating the resin 18 in the container and the part support heating device 178 is positioned adjacent the part support 20 for heating the part support and part 16 during the infusion process. As shown in FIGS. 2 and 11, the apparatus 10 further comprises a programmable container heating device controller 180 mounted on the body 12 and operatively connected to the controller 64 and the container heating device 176 for controlling operation of the container heating device. As shown in FIGS. 2 and 11, the apparatus 10 comprises a programmable part support heating device controller 182 mounted on the body 12 and operatively connected to the controller 64 and the part support heating device 178 for controlling operation of the part support heating device. It is contemplated that the primary controller 64 may be configured to perform the functions of the heating device controllers 180, 182. Although other types of heating device controllers 180, 182 may be used without departing from the scope of the present invention, in one embodiment each heating device controller is a F4SH-CAAO-01RG available from Watlow Electric Manufacturing Co. of St. Louis, Mich. As shown in FIGS. 2, 7 and 14, the apparatus 10 further comprises a container heating device port 184 and a part support heating device port 186 operatively connected to the respective heating device controller 180, 182 for connecting the heating device controllers to the corresponding heating device 176, 178.

Figure 17:
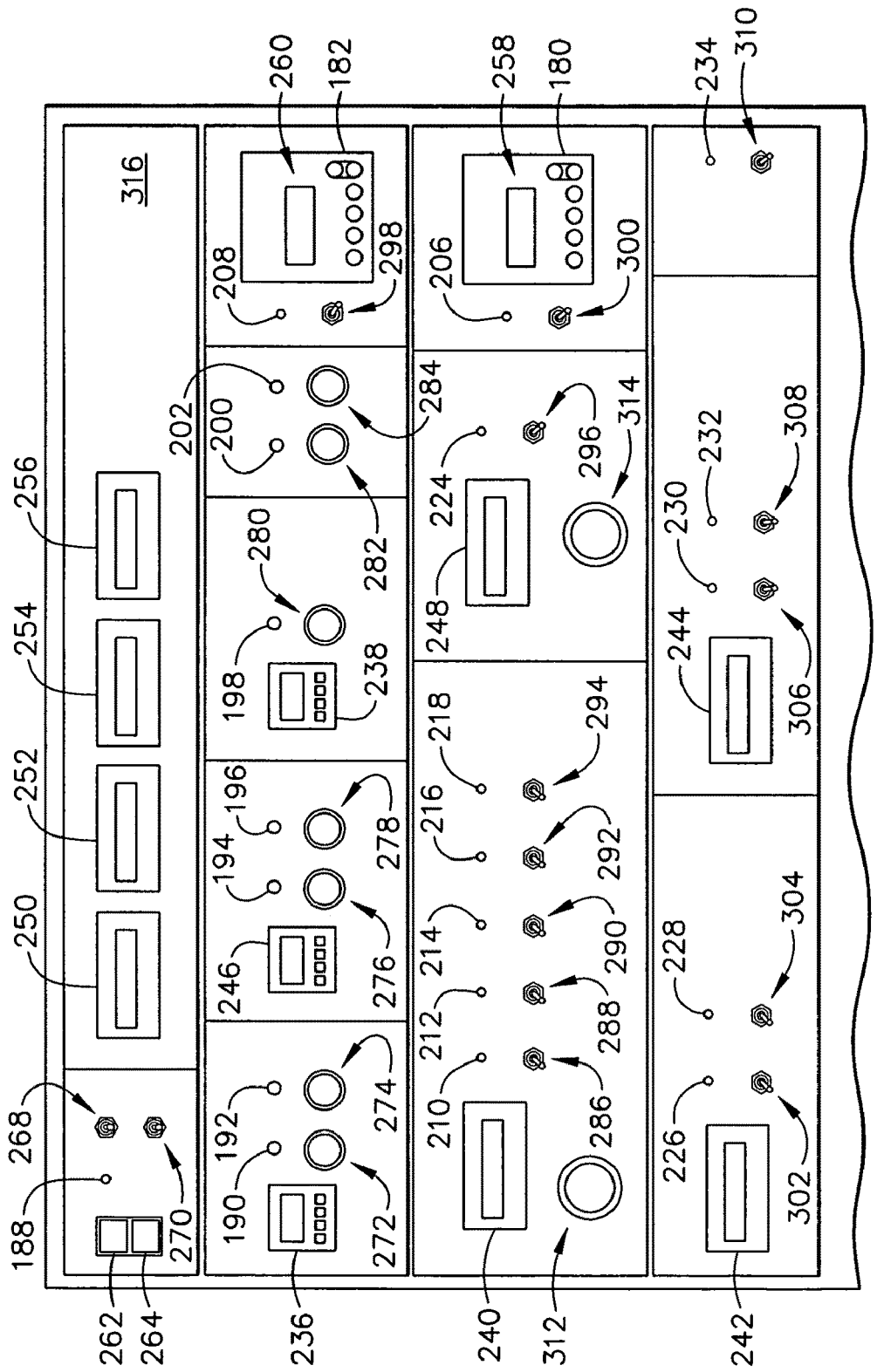
FIG. 17 is a perspective of a top panel of the apparatus.

As shown in FIGS. 2 and 17, the apparatus 10 comprises a plurality of indicators 188-234 (even reference numbers), displays 236-260 and controls 262-314 operatively connected to the controller 64. In one embodiment, the indicators 188-234, displays 236-260 and controls 262-314 are positioned on a control panel 316 of the apparatus 10. The indicators 188-234 indicate statuses of apparatus 10 operations and include an activation indicator 188 for indicating when the apparatus is turned on. The indicators 188-234 include an inner cover leak check indicator 190 operatively connectable to the inner cover 22 for selectively indicating when an inner cover leak check step of the infusion process may be performed, may not be performed, is being performed or has failed. For example, in one embodiment, the inner cover leak check indicator 190 flashes yellow to indicate the inner cover leak check step may be performed, flashes green when the inner cover leak check step is being performed, is unlit when the leak check may not be performed, is lit green when the leak check has been successfully completed and is red when the leak check has failed (i.e., a leak was found). The indicators 188-234 further include an outer cover leak check indicator 192 operatively connectable to the outer cover 26 for selectively indicating when an outer cover leak check step of the infusion process may be performed, may not be performed, is being performed or has failed. The indicators 188-234 also include a heat indicator 194 for selectively indicating when a heat step of the infusion process may be performed, may not be performed, is being performed or has encountered problems. In addition, the indicators 188-234 include a compaction indicator 196 for selectively indicating when a compaction step of the infusion process may be performed, may not be performed, is being performed or has encountered problems. Further, the indicators 188-234 include a resin infusion indicator 198 for selectively indicating when a resin infusing step of the resin infusion process may be performed, may not be performed, is being performed and has encountered problems. The indicators 188-234 include a pause indicator 200 and a reset indicator 202 for selectively indicating when operation of the apparatus 10 is being paused or reset, respectively. As shown in FIG. 12, the indicators 188-234 include an infusion termination indicator 204 for indicating that apparatus 10 operations have been stopped by the user or apparatus. The indicators 188-234 also include a container heating device indicator 206 and a part support heating device indicator 208 for indicating when the container heating device and part support heating device, respectively, are operating.

The indicators 188-234 further include inlet valve indicators 210, 212, 214, 216, 218 for indicating whether the inlet vent valve 108, the regulated inlet valve 102, the unregulated inlet valve 106, the inlet restrictor 44 and the material delivery line restrictor 166, respectively, are open or closed. The indicators 188-234 also include an inlet restrictor indicator 216 for indicating when the inlet restrictor valves 128, 130 are set so the inlet restrictor 44 is open or closed and a reservoir indicator 218 for indicating when the reservoir valves 168, 170 are set so the reservoir restrictor 166 is open or closed. In addition, the indicators 188-234 include an intensifier tool valve indicator 224 for indicating whether the intensifier tool valve 146 is in a fill mode, in a vent mode or closed. The indicators 188-234 further include outlet valve indicators 226, 228 for indicating when the outlet vent valve 116 and outlet vacuum circuit valve 112 are open or closed, respectively. In addition, the indicators 188-234 include outer cover valve indicators 230, 232 for indicating when the outer cover valve 120 and outer cover vent valve 124 are open or closed, respectively. The indicators 188-234 also include a vacuum source indicator 234 for indicating when the vacuum source 86 is operating. Although the indicators 188-234 may be other types without departing from the scope of the present invention, in one embodiment each indicator includes a conventional light emitting diode.

The displays 236-260 display operational times, pressures and temperatures of the apparatus 10 during operation. The displays 236-260 include a leak check timer display 236 for displaying an operational time of an inner cover leak check step and an outer cover leak check step of the infusion process. The leak check timer display 236 and controller 64 can be configured to display a running or duration time from a start of the inner cover leak check step and outer cover leak check step to a stop of the respective steps or display a countdown during which the respective steps are performed. The displays 236-260 further include a resin infusion timer display 238 for displaying an operational time of a part infusing step of the infusion process. The resin infusion timer display 238 and controller 64 can be configured to display a running or duration time from a start of the part infusing step or display a countdown during which the infusion is performed. The displays 236-260 also include an inlet controls display 240 and an outlet controls display 242. The inlet controls display 240 shows pressure values measured by the inlet vacuum circuit transducer 104. The outlet controls display 242 shows pressure values measured by the outlet vacuum circuit transducer 114. In addition, the displays 236-260 further include an outer cover controls display 244 for displaying pressure values measured by the outer cover transducer 122. Further, the displays 236-260 include a compaction timer display 246 for displaying an operational time of a compaction step of the infusion process. For embodiments of the apparatus 10 using an intensifier tool 136, the displays 236-260 include a compaction controls display 248 to display pressure values measured by the transducer 150 in the intensifier tool fluid circuit 82.

The apparatus may be used in combination with a plurality of sensors 104, 114, 122, 150, 318-328 including the pressure transducers 104, 114, 122, 150 and thermal sensors 318-328. The thermal sensors 318-328 include a first thermal sensor 318 operatively connected to the part 16 for measuring a temperature of the part. The first thermal sensor 318 may be positioned within the part 16 or adjacent the part. The thermal sensors 318-328 further include a second thermal sensor 320 operatively connected to the part 16 for measuring a temperature of the part. The second thermal sensor 320 may be positioned within or adjacent the part 16 and, in one embodiment, is positioned adjacent an end of the part 16 that is generally opposite an end of the part that the first thermal sensor 318 is positioned adjacent. In addition, the thermal sensors 318-328 also include a third thermal sensor 322 operatively connected to the resin 18 disposed in the inlet vacuum container 40 during the infusion process for measuring a temperature of the resin. Further, the thermal sensors 318-328 further include a fourth thermal sensor 324 operatively connected to the part support 20 for measuring a temperature of the support. A fifth thermal sensor 326 is operatively connected to the inlet vacuum container heating device 176 for measuring a temperature of the inlet vacuum container heating device. A sixth thermal sensor 328 is operatively connected to the part support heating device 178 for measuring a temperature of the part support heating device. Although the thermal sensors 318-328 may be other types without departing from the scope of the present invention, in one embodiment each sensor is a thermocouple. The controller 64 may be programmed with desired temperature ranges for each thermal sensor 318-328 and programmed to produce an alarm and/or suspend apparatus 10 operations when temperatures outside of the respective range are detected. Although controller 64 may be programmed with other temperature ranges with respect to the thermal sensors 318-328 without departing from the scope of the present invention, in one embodiment a temperature range associated with the first and second thermal sensors 318, 320 is from about 160° F. to about 180° F., a range associated with the third thermal sensor 322 is from about 140° F. to about 210° F. and a range associated with the fourth thermal sensor 324 is from about 140° F. to about 230° F. The controller 64 may be programmed with a maximum temperature value for the third thermal sensor 322, which measures resin 18 temperature during the infusion process. In one embodiment, the maximum temperature value programmed in the controller 64 with respect to the third thermal sensor 322 is between about 240° F. and about 255° F., corresponding to temperatures at which unwanted exothermic conditions in the resin 18 are present or likely. When the processor 10 determines that an exothermic condition exists or is imminent from signals received from the third thermal sensor 322, an audible buzzer) (not shown) may be sounded, apparatus 10 operations are suspended and the material deliver line restrictor 166 is opened to introduce material (e.g., water) into the inlet vacuum container 40 and resin 18 thereby neutralizing the resin to end the exothermic condition.

As shown in FIGS. 2, 7 and 14, the apparatus 10 further comprises a first thermal sensor connector 330, a second thermal sensor connector 332, a third thermal sensor connector 334, a fourth thermal sensor connector 336, a fifth thermal sensor connector 338 and a sixth thermal sensor connector 340 operatively connected to the controller 64 for connecting the controller to the first, second, third, fourth, fifth and sixth thermal sensors 318, 320, 322, 324, 326, 328, respectively.

As shown in FIG. 17, the displays 236-260 further include a first temperature display 250, a second temperature display 252, a third temperature display 254 and a fourth temperature display 256 for displaying temperatures measured by the first, second, third and fourth thermal sensors 318, 320, 322, 324, respectively. Each temperature display 250, 252, 254, 256 is operatively connected to the controller 64 to receive values measured by the corresponding thermal sensor 318, 320, 322, 324. The heating device controllers 180, 182 may also include displays 258, 260 for displaying temperatures measured by the fifth thermal sensor 326 and sixth thermal sensor 328, respectively. Although the displays 236-260 may be other types without departing from the scope of the present invention, in one embodiment each displays is a digital display.

A user controls operation of the apparatus 10 using the controls 262-314. Various control interfaces (i.e., toggle switches, buttons and knobs) may be used for each control 262-314 without departing from the scope of the present invention. For example, where a button is shown in the figures, a switch or other conventional control interface may be used. The controls 262-314 include an "on" button 262 and an "off" button 264 for turning the apparatus on and off, respectively. When the apparatus 10 is turned off, all valves go to a default open position except the retract inlet valve 130 and the retract reservoir valve 170, which are closed so the inlet restrictor 44 and material delivery line restrictor 166, respectively, remain in their closed, restricting, positions. A termination switch 266 is mounted on the body 12, as shown in FIG. 12, for halting apparatus 10 operations. In one embodiment, the termination switch 266 is mounted on the control panel 316. The controls 262-314 further include an automatic/manual mode switch 268 for switching the apparatus 10 between an automatic mode and a manual mode. In addition, the controls 262-314 include an intensifier switch 270 for selecting whether intensification will be performed during the compaction step of the infusion process. The controls 262-314 include automatic controls 272-284, which only function when the apparatus 10 is in the automatic mode (i.e., the automatic/manual mode switch 268 is set to "auto") and manual controls 286-314, which only function when the apparatus 10 is in the manual mode (i.e., the automatic/manual mode switch 268 is set to "manual"). The automatic controls 272-284 include an inner cover leak check button 272 and an outer cover leak check button 274 for starting the inner cover leak check step and outer cover leak check step, respectively, of the infusion process when pressed. The automatic controls 272-284 further include a heat button 276 for starting the application of heat to the part during the compaction step of the infusion process and a compact button 278 for starting a compacting step of the compaction process when pressed during the automatic mode. The automatic controls 272-284 also include an infusion button 280 for starting the resin infusing step of the infusion process when pressed. In addition, the automatic controls 272-284 include a pause button 282 and a reset button 284 for pausing and resetting apparatus 10 operations, respectively. Pressing the pause button 282 results in all apparatus 10 functions being suspended. For example, if the pause button 282 is pressed while a vacuum is being pulled in the inner cover 22 during a leak check step of the infusion process, the outlet vacuum circuit valve 112 is closed to stop the pull of vacuum on the inner cover interior 24 by the outlet vacuum line 52. Pressing the reset button 284 causes the apparatus 10 to begin operation at the beginning of the stage it had been paused at. For example, if the reset button 284 is pressed after the apparatus 10 has been paused during an inner cover leak check, the apparatus would proceed to perform the inner cover leak check from the beginning of the check, not from the point at which the pause button was pressed.

The manual controls 286-314 include an inlet vent valve switch 286 for opening and closing the inlet vent valve 108 and a regulated inlet valve switch 288 for opening and closing the regulated inlet valve 102 during operation of the apparatus 10 in the manual mode. The manual controls 286-314 further include an unregulated inlet valve switch 290 for opening and closing the unregulated inlet valve 106 during operation of the apparatus 10 in the manual mode. The manual controls 286-314 also include an inlet restrictor switch 292 for opening and closing the inlet restrictor 44 during operation of the apparatus 10 in the manual mode. To open the inlet restrictor 44, the apparatus 10 opens the retract inlet valve 130 and closes the extend inlet valve 128. To close the inlet restrictor 44, the apparatus 10 closes the retract inlet valve 130 and opens the extend valve 128. In addition, the manual controls 286-314 include a material delivery line restrictor switch 294 for opening and closing the material delivery line restrictor 166. To open the material delivery line restrictor 166, the apparatus 10 opens the retract reservoir valve 170 and closes the extend reservoir valve 168. To close the material delivery line restrictor 166, the apparatus 10 closes the retract reservoir valve 170 and opens the extend reservoir valve 168.

The manual controls 286-314 further include a pneumatic valve switch 296 for opening and closing the pneumatic valve 154 during operation of the apparatus 10 in the manual mode. To open and close the pneumatic valve 154, the apparatus 10 opens and closes the intensifier tool valve 146, which in turn actuates the pneumatic motor 152 to open and close the pneumatic valve. The manual controls 286-314 also include a part support heating device switch 298 for turning the part support heating device 178 on and off and a container heating device switch 300 for turning the container heating device 176 on and off. The manual controls 286-314 further include an outlet vent valve switch 302 for opening and closing the outlet vent valve 116 and an outlet vacuum circuit valve switch 304 for opening and closing the outlet vacuum circuit valve 112. Moreover, the manual controls 286-314 include an outer cover valve switch 306 and an outer cover vent valve switch 308 for opening and closing the outer cover valve 120 and outer cover vent valve 124, respectively, during operation of the apparatus 10 in the manual mode. The manual controls 286-314 also include a vacuum source switch 310 turning the vacuum source 86 on and off. In addition, the manual controls 286-314 include a vacuum regulator knob 312 for adjusting the inlet regulator 100 to regulate the pressure of fluid in the inlet vacuum circuit 74 and a compaction regulator knob 314 for adjusting the intensifier tool fluid pressure regulator 148 to regulate the pressure of fluid in the intensifier tool fluid circuit 82.

Figure 16:
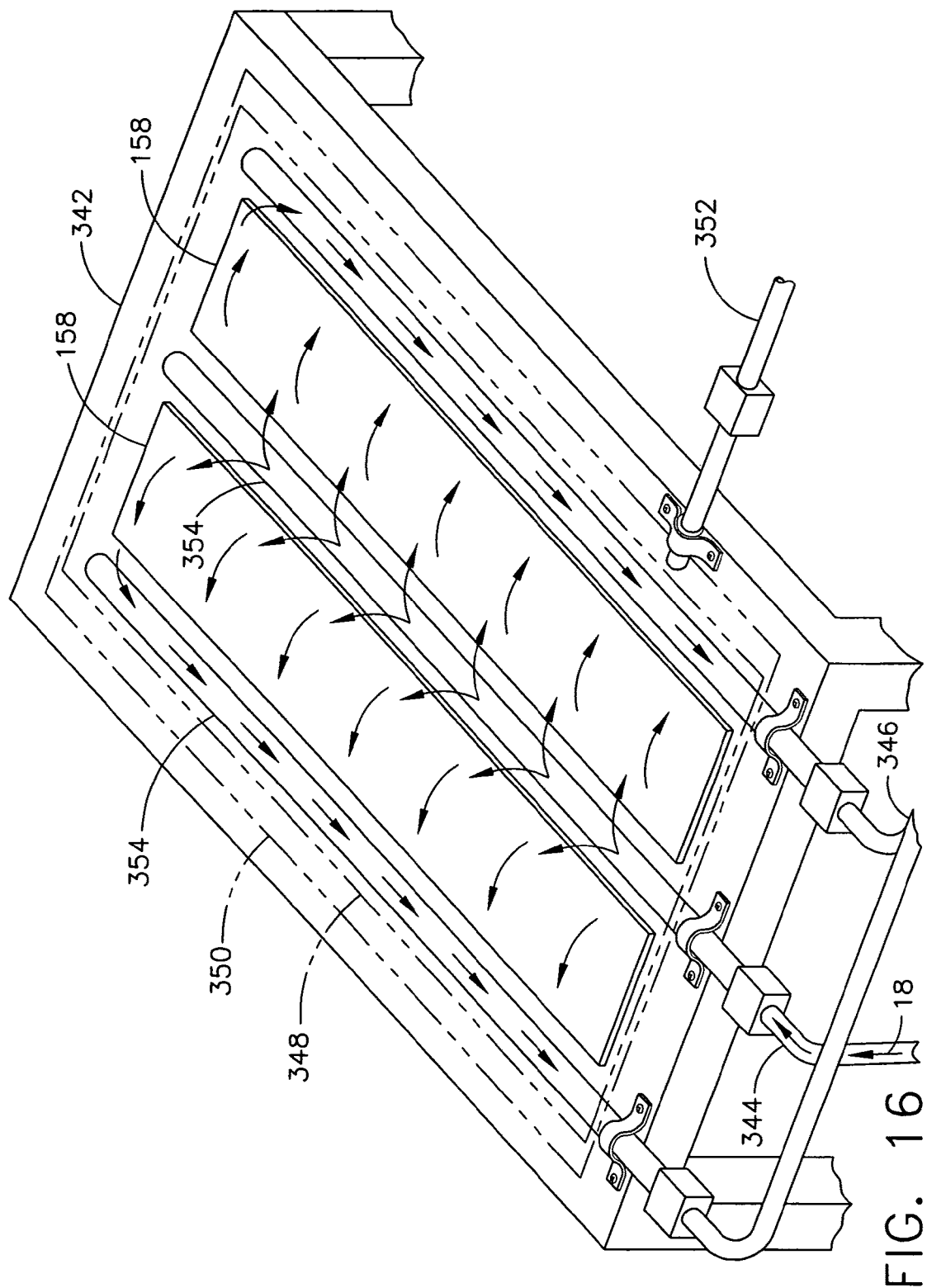
FIG. 16 is a cross section of alternate parts and components used in combination with the apparatus.
Figure 18:
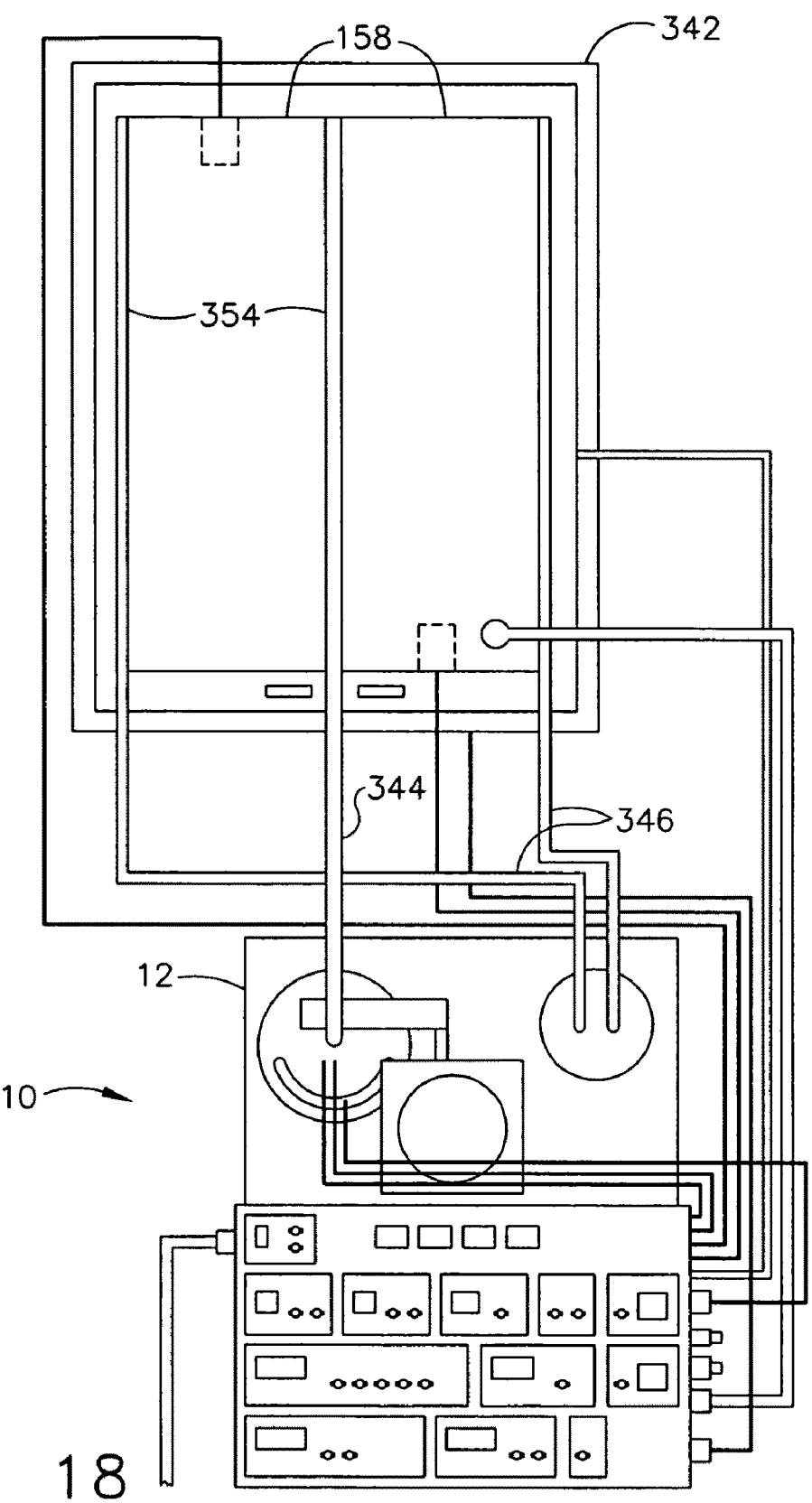
FIG. 18 is a top plan of the apparatus in combination with the alternate components shown in FIG. 16.

FIGS. 16 and 18 show a second embodiment of the present invention in which the apparatus 10 is used to simultaneously infuse two parts 158 with resin 18. Many parts 158 may be infused in a single infusion process of the apparatus 10. The parts 158 shown in FIG. 16 are substantially flat but may have other shapes without departing from the scope of the present invention. In this embodiment, the part support 342 is a table and a single inlet vacuum line 344 is mounted on the part support between the two parts 158. Outlet vacuum lines 346 are mounted on the part support 342 adjacent each part 158 opposite the inlet vacuum line 344. As described with respect to the first embodiment, resin transfer media (not shown in FIG. 16 or 18) may be selectively disposed adjacent the parts 158 to facilitate resin 18 flow through the parts. As shown in FIG. 16, an inner cover 348 and an outer cover 350 are sealed against the part support 342 during the infusion process. An outer cover vacuum line 352 is secured to the part support 342 so the outer cover vacuum line terminates under the outer cover 350 when it is attached to the part support. The inlet and outlet vacuum lines 344, 346 may include delivery arms 354. The outer cover vacuum line 352 may also include delivery arms (not shown).

Figure 19:
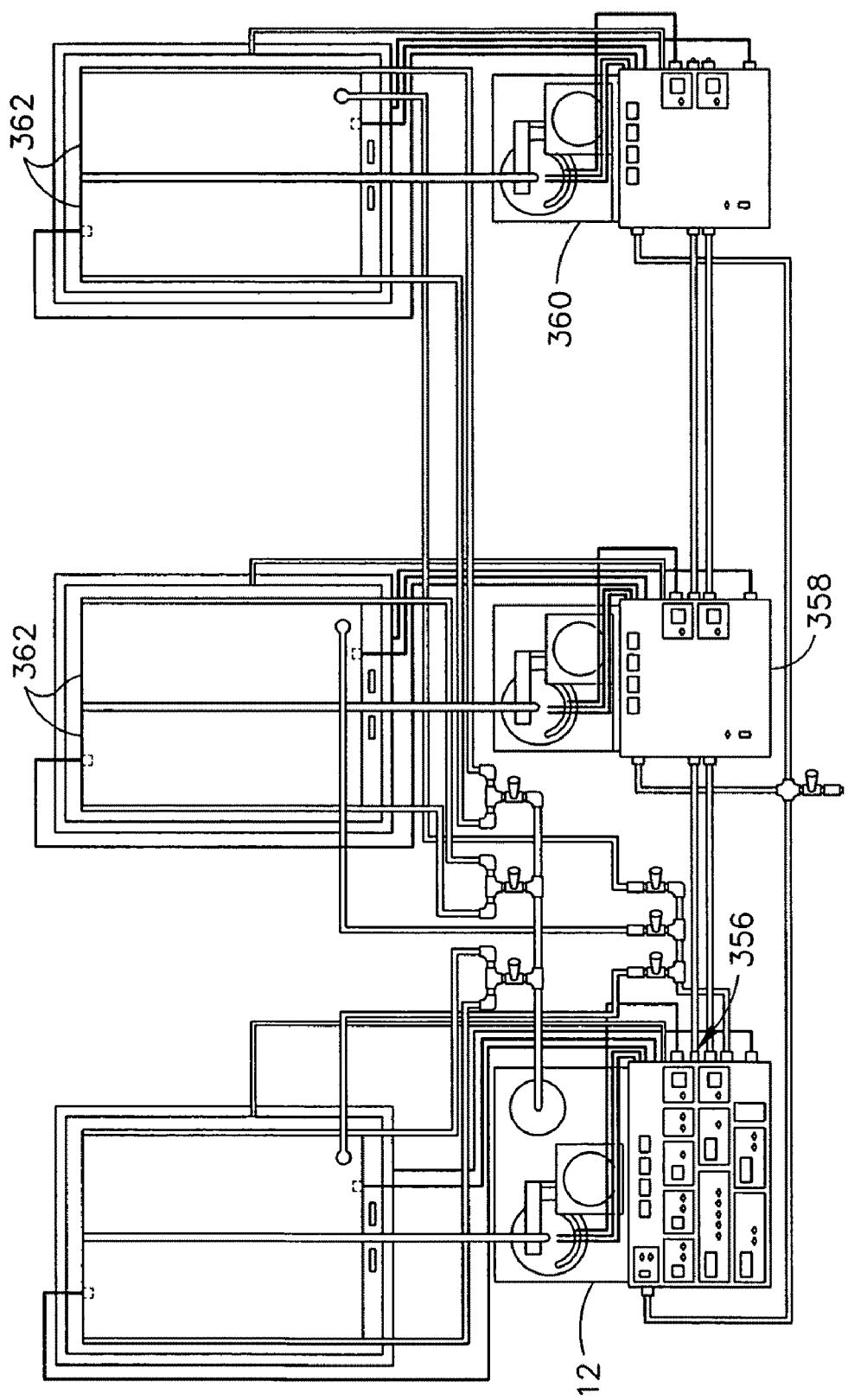
FIG. 19 is a top plan of the apparatus in combination with auxiliary infusion machines and components used in combination with the apparatus and machines.

As shown in FIGS. 1, 2, 7 and 14, the apparatus 10 further comprises an auxiliary infusion machine port 356 mounted on the main body 12. FIG. 19 shows a third embodiment of the present invention in which the primary body 12 is operatively connected to one or more auxiliary infusion machines 358, 360 by way of the auxiliary infusion machine port 356 for simultaneously infusing multiple parts 362 with resin using the apparatus 10 and the auxiliary machines. In FIG. 19, six parts 362 are shown in the resin infusion setup. Specifically, the auxiliary machines 358, 360 are connected to the processor 64 (not shown in FIG. 19) by way of the auxiliary infusion machine port 356. The processor 64 controls operation of the primary machine, corresponding with the primary body 12, and the auxiliary machines 358, 360. It is contemplated that each of the primary machine and auxiliary machines may have its own processor, which may be connected to the processors of the other machines, without departing from the scope of the present invention. As shown in FIG. 19, the auxiliary machines 358, 360 may use the vacuum and pressurized fluid sources of the main machine. It is contemplated that the auxiliary machines 358, 368 may use vacuum and pressurized fluid sources that are separate from or supplementary to the vacuum and pressurized fluid sources of the main machine. More than two auxiliary machines 358, 360 may be connected to the main body 12 without departing from the scope of the present invention.

The apparatus 10 operates in the automatic or manual modes depending on whether the automatic/manual switch 268 is set to "auto" or "manual". Before the apparatus 10 is used in either mode, the part 16, part support 20 and vacuum lines 36, 52 should be properly arranged, as shown in FIGS. 1 and 3. Specifically, the part 16 must be positioned on the part support 20 and resin transfer media 32, 34 may be positioned adjacent the part. After positioning the part 16 on the support 20, delivery arms 58 of the inlet and outlet vacuum lines 36, 52 are positioned adjacent the part. The delivery arms 58 are positioned at opposite ends of the part 16 so resin 18 is infused through a substantial entirety of the part as it flows from the inlet vacuum line 36 to the outlet vacuum line 52 during the resin infusing step of the infusion process. The delivery arms 58 of the vacuum lines 36, 52 are secured to the part support 20, the part 16 and/or the resin transfer media 32, 34. The delivery arms 58 may be secured to the part 16, the support 20 and/or the transfer media 32, 34 using tape 60. The tape 60 is applied in a manner allowing easy resin 18 flow through the arms 58 and interior 24. In one embodiment, as shown in FIG. 3, easy flow is facilitated by applying tape 60 all the way around the arms 58 except for on under and part-side portions of the arms. In another embodiment (not shown), tape 60 is applied all around the arms 58 except on an under portion, which is directly adjacent the part 16 and/or the transfer media 32, 34.

After the part 16, part support 20 and vacuum lines 36, 52 have been arranged, the inner cover 22 is installed and the resulting interior 24 is checked for leaks. To install the inner cover 22, the user secures an adhesive 30, such as double-sided tacky tape or black chromate sealant tape, to the part support 20 adjacent the part 16. The user must be careful to position the adhesive 30 on the part support 20 and around the delivery arms 58 so a substantially air-tight seal is created between the inner cover 22 and the part support when the inner cover is attached to the part support by way of the adhesive. Next, the inner cover 22 is secured to the part support 20 by way of the adhesive 30 to create the sealed interior 24. In one embodiment, the inner cover 22 is purposely attached to the part support 20 in a manner creating folds of extra material (not shown in detail) in the cover to accommodate potential material requirements when the inner cover is repeatedly placed under vacuum and released from vacuum. The apparatus 10 is then used to check for leaks in the inner cover 22 and the seal created between the inner cover and the part support 20.

Before using the apparatus 10, it must be activated by pressing the "on" button 262. The activation indicator 188 illuminates green when the apparatus 10 is activated. When the apparatus 10 is activated in the automatic mode (i.e., the automatic/manual mode switch 268 is set to "auto"), all vacuum, vent and air valves are switched to "close" except the extend reservoir valve 168 and extend inlet valve 128, which are opened or kept open so the material delivery line restrictor 166 and inlet restrictor 44, respectively, are in their closed, restricting position. Whether the apparatus 10 is in the automatic or manual mode, the indicators 210, 212, 214, 216, 218, 224, 226, 228, 230, 232 corresponding to the respective valves 108, 102, 106, 44, 166, 146, 116, 112, 120, 124 illuminate green to indicate the valves are closed. In the case of the indicators 216, 218 corresponding to the restrictors 44, 166, the green light indicates that the respective extend valves 132, 168 are open and the retract valves 134, 170 are closed so that the restrictors are closed. Because the toggle switches 286-310 are inoperable during the automatic mode, the true operating status (i.e., open/closed or on/off) of the respective valves 108, 102, 106, 44, 166, 146, 116, 112, 120, 124 and devices 176, 178 can be reliably determined from the corresponding indicators 210, 212, 214, 216, 218, 224, 226, 228, 230, 232, 208, 206 and not from the switches when operating in the automatic mode.

After the machine is set to automatic mode using the automatic/manual switch 268, the inner cover 22 leak check indicator 190 will flash yellow to indicate that the apparatus is ready to check the interior 24 for leaks. The processor 64 is programmed to lockout subsequent process steps until a present process step is successfully performed. For example, the apparatus 10 will not allow a user to check the outer cover interior 28 for leaks until the inner cover interior 24 has been checked and found to have no leaks. These lock-out functions ensure the process is performed in the proper order, steps are not skipped and subsequent steps are not performed until earlier steps are completely performed. Before the inner cover 22 leak check is performed, the user selects whether an intensifying step will be performed. The intensifying step would include, for example, having the apparatus 10 compacts portions of the part 16 by using the compaction intensifier tool 136. Because intensifying is generally not needed during compaction of substantially flat parts 158 (shown in FIGS. 16 and 18), the intensifier switch 270 may be set to "no." As described above, a user may intensify a substantially flat part 158 using an intensifier tool 136 during compaction.

To initiate the automatic inner cover 22 leak check, a user presses the inner cover leak check button 272 while the inner cover leak check indicator 190 is flashing yellow. After the inner cover leak check button 272 has been pressed, the inner cover leak check indicator 190 will flash green to indicate the inner cover 22 leak check is in progress. At the start of the inner cover 22 leak check, the controller 64 closes the inlet vacuum valves 102, 106, the inlet vent valve 108 and the inlet restrictor 44 (i.e., by opening the extend inlet valve 128 and closing the retract inlet valve 130) to isolate the interior 24 formed by the inner cover 22 and the part support 20 from the inlet vacuum container 56. The inlet valve indicators 210, 212, 214, 216, 218 will be lit green to indicate the corresponding valves 108, 102, 106, 44, 166 are closed. Although it is not necessary to close both the inlet vacuum and vent valves 102, 106, 108 and the inlet restrictor 44, in one embodiment the apparatus 10 is programmed to close them all to provide multiple barriers isolating the interior 24 from the vacuum source 86. Because the inner cover 22 leak check can be performed using a full vacuum (i.e., about 29.92 inches Hg) from the vacuum source 86, the inner cover 22 leak check is performed by pulling the vacuum through the outlet vacuum circuit 76, which is unregulated. The controller 64 opens the outlet vacuum circuit valve 112 and keeps the outlet vent valve 116 closed so a vacuum can be pulled in the interior 24 by the vacuum source 86 by way of the outlet vacuum circuit 76 and outlet vacuum line 52. The outlet vacuum valve indicator 228 will be unlit to indicate the outlet vacuum valve 112 is open and the outlet vent valve indicator 226 will be lit green to indicate the outlet vent valve 116 is closed.

After the apparatus 10 has set the valves 44, 102, 106, 108, 112, 116, 166 as described, the controller 64 actuates the vacuum source 86 to introduce full vacuum to the interior 24 by way of the outlet vacuum circuit 76 and the outlet vacuum line 52. The vacuum source indicator 234 will be lit green to indicate the vacuum source 86 is operating. In one embodiment, the vacuum is introduced for about 30 seconds to allow the components (e.g., the part 16 and the inner cover 22)

affected by the vacuum to stabilize in response to the vacuum being introduced before the next step is commenced. The controller 64 may display the 30 second countdown on the leak check timer display 236. Next, the outlet vacuum circuit valve 112 is closed to isolate the inner cover interior 24 from the vacuum source 86 and the controller 64 measures the pressure continually or intermittently using the outlet vacuum circuit transducer 114 for a predetermined amount of time to determine if there are any leaks in the interior 24 formed by the inner cover 22 and the part support 20. When the outlet vacuum circuit valve 112 is closed, the outlet vacuum valve indicator 228 turns green to indicate the outlet vacuum circuit valve is closed. In one embodiment, vacuum is held for between about four minutes and about six minutes to determine if there are any leaks in the interior 24. In one embodiment, the controller 64 displays a five minute countdown on the leak check timer display 236 during the inner cover 22 leak check.

A successful inner cover 22 leak check is accomplished when the amount of pressure change in the interior 24 measured by the outlet vacuum circuit transducer 114 is not greater than a predetermined amount. In one embodiment, the predetermined amount of pressure change is 0 inches Hg. The controller 64 may display the pressure values being measured by the outlet vacuum circuit transducer 114 on the outlet controls display 242 during the inlet cover 22 leak check and/or display an amount of any pressure change detected during the check after the predetermined period of time. If the inner cover 22 leak check is unsuccessful, the inner cover leak check indicator 190 will be solid (i.e., not flashing) red or flash red, the audible buzzer may be sounded and the pause and reset indicators 200, 202 will flash yellow. The controller 64 will not allow the user to proceed to any other step of the infusion process until the inner cover 22 leak check is successfully completed. If an inner cover leak check was unsuccessful, the user should press the pause button 282 to suspend apparatus 10 operations and may then attempt to repair the inner cover 22/part support 20 seal. After the leak is found and repaired, the user presses the reset button 284 to resume operation at the beginning of the inner cover 22 leak check. After a successful inner cover 22 leak check is performed, the inner cover leak check indicator 190 will turn solid green and the outer cover leak check indicator 192 will flash yellow to indicate that the outer cover 26 leak check may be performed. After a successful inner cover 22 leak check, the outlet vacuum circuit 112 is reopened to reintroduce the vacuum source 86 to the inner cover interior 24 and the outlet vacuum circuit valve indicator 228 is unlit to indicate that the outlet vacuum circuit valve is open.

To perform the outer cover 26 leak check, the user first secures adhesive 30 to the part support 20 adjacent the adhesive secured to the part 16 for attaching the inner cover 22 to the part support. The user must be careful to position the adhesive 30 on the part support 20 and around the outer cover vacuum line 62 and any delivery arms 58 connected to the outer cover vacuum line so a substantially air-tight seal is created between the outer cover 26 and the part support 20 when the outer cover is attached to the part support by way of the adhesive. Next, the outer cover 26 is attached to the part support 20 by way of the adhesive 30. In one embodiment, the outer cover 26 is purposely attached to the part support 20 in a manner whereby the outer cover has folds of extra material (not shown) to accommodate potential material requirements when the outer cover is repeatedly placed under and released from vacuum. The apparatus 10 is then used to check for leaks in the interior 28 formed by the outer cover 26 and the part support 20.

To initiate an automatic outer cover 26 leak check, a user presses the outer cover leak check button 274 while the outer cover leak check indicator 192 is flashing yellow. After the outer cover leak check button 274 has been pressed, the outer cover leak check indicator 192 will flash green to indicate the outer cover 26 leak check is in progress. The controller 64 starts the outer cover 26 leak check by pulling a vacuum between the outer cover 26 and the part support 20 using the vacuum source 86 by way of the outer cover vacuum circuit 78 and the outer cover vacuum line 62. A regulator is not needed in the outer cover vacuum circuit 78 because the outer cover 26 leak check and subsequent vacuum steps can be performed using a full vacuum from the vacuum source 86. The controller 64 opens the outer cover vacuum valve 120 and keeps the outer cover vent valve 124 closed so a vacuum can be pulled between the outer cover 26 and the part support 20 by way of the outer cover vacuum circuit 78 and the outer cover vacuum line 62. The outer cover valve indicator 230 will be unlit to indicate the outer cover vacuum valve 120 is open and the outer cover vent valve indicator 232 will be lit green to indicate the outer cover vent valve 124 is closed. Next, the controller 64 actuates the vacuum source 86 to introduce full vacuum beneath the outer cover 26 by way of the outer cover vacuum circuit 78 and the outer cover vacuum line 62. The vacuum source indicator 234 will be lit green to indicate the vacuum source 86 is operating. In one embodiment, vacuum is introduced to the outer cover interior 28 for about 30 seconds to allow the components (e.g., the part 16 and the outer cover 26) affected by the vacuum to stabilize in response to the vacuum being introduced before the next step can be started. During this stabilization period, the controller 64 may display a 30 second countdown on the leak check timer display 236.

After full vacuum has been pulled in the outer cover interior 28, the outer cover valve 120 is closed to isolate the outer cover interior from the vacuum source 86 and the controller 64 measures pressure continually or intermittently using the outer cover transducer 122 for a predetermined amount of time to determine if there are any leaks in the sealed interior 28 formed by the outer cover 26 and part support 20. The outer cover valve indicator 230 will be lit green to indicate the outer cover valve 120 is closed. In one embodiment, the outer cover interior 28 is isolated from the outer cover vacuum circuit 78 to hold vacuum in the outer cover interior for between about 4 minutes and about 6 minutes to determine if there are any leaks in the sealed interior 28 formed by the outer cover 26 and part support 20. In one embodiment, the controller 64 displays a 5 minute countdown on the leak check timer display 236 during the outer cover 26 leak check. A successful outer cover 26 leak check is accomplished when the amount of pressure change in the outer cover interior 28 measured by the outer cover transducer 122 is greater than a predetermined amount. In one embodiment, the predetermined amount of pressure change within the outer cover interior 28 is between about 2 inches Hg and about 4 inches Hg. The controller 64 displays the pressure values being measured by the outer cover transducer 122 on the outer cover controls display 244 during the outer cover 26 leak check and/or displays an amount of any pressure change detected during the check after the predetermined period of time.

If the outer cover 26 leak check is unsuccessful, the outer cover leak check indicator 192 will be or flash red, the audible buzzer is sounded and the pause and reset indicators 200, 202 will flash yellow. The controller 64 will not allow the user to proceed to the compaction step or any other step of the infusion process until the outer cover 26 leak check is successfully completed. Upon unsuccessful outer cover 26 leak check, the user should press the pause button 282, which suspends apparatus 10 operations and may then attempt to repair the outer cover 26/part support 20 seal. After the leak is found and repaired, the user presses the reset button 284 to have the apparatus 10 resume operation at the beginning of the outer cover 26 leak check. After a successful outer cover 26 leak check is performed, the outer cover leak check indicator 192 turns solid green, the heat indicator 194 and/or the compaction indicator 196 will flash yellow to indicate that the outer cover 26 leak check has been successfully completed and the heat and the compact steps can be performed individually or simultaneously. After a successful outer cover 26 leak check, the outer cover vacuum valve 120 is reopened to reintroduce vacuum to the outer cover interior 28 and the outer cover vacuum valve indicator 230 is unlit to indicate the outer cover vacuum valve is open.

The compaction step may be performed with or without an intensification step. Intensification is performed if the intensifier switch 270 is set to "yes." Before, during or after the compaction step, the heat button 276 is pressed to start heating the part 16 and part support 20 using the part support heating device 178. The inlet vacuum container heating device 176 is not heated until later, just before the infusing step, when the container 42 holding the resin 18 is positioned in the inlet vacuum container 40. The heating device controllers 182 may be programmed to gradually ramp the temperature of the heating device 178 up to its operating ranges when the heating device controller is activated. In one embodiment, a target temperature for each of the part 16 and the part support 20 is about 170° F. The heat indicator 194 flashes green and the part support heating device indicator 208 turn green to indicate that heating is being performed. The temperature displays 250, 252, 254, 256, 258, 260 show temperatures measured by the respective thermal sensors 318, 320, 322, 324, 326, 328 during the part heating step and subsequent resin 18 heating and resin infusing steps. When the part 16 and part support 20 reach their respective target temperature for infusion, the heat indicator 194 turns solid green.

If the intensifier switch 270 is set to "yes," the intensifier details 140 are positioned into the corresponding radii R of the part and the expanders 142 are connected to the intensifier tool 136, as shown in FIGS. 2, 15A and 15B. The user then positions the intensifier details 140 into the part by clamping the intensifier tool block 138 to the part support 20 with the intensifier details and expanders 142 between the block and part support using clamps 144 as shown in FIG. 15B. The intensifier tool 136 is seated into the part 16 by inflating the expanders 142 using the pressurized fluid source by way of the intensifier tool fluid circuit 82. The intensifier tool valve indicator 224 turns green during intensification to indicate the intensifier tool valve 146 is in a fill or open position. Inflating the expanders 142 forces the intensifier details 140 into the part radii R because the intensifier tool block 138 does not move. As will be appreciated by those skilled in the art, pressure may be repeatedly introduced and released to the expanders 142 by opening, closing and venting the intensifier tool valve 146 and/or the pneumatic valve 154. In one embodiment, this impaction cycling is performed three times. In another embodiment the impaction cycling is performed once and includes introducing pressure in a range of about 40 PSI to about 80 PSI to the expanders 142 for a time period in a range of about 30 seconds to 90 seconds and then the expanders are vented to atmosphere by closing the tool valve 146 and venting through the pneumatic valve 154 or other venting valve (not shown) in the intensifier tool circuit 82. The particular amount of intensification for a particular part and setup can be determined through experimentation. Too much intensification can result in over thinning of the part 16 radii R. After the one or more intensification cycles, the expanders 142 are again pressurized to position the intensifier tool 136 against the part for the subsequent compaction step. In one embodiment, the expanders 142 are held at a pressure of about 60 PSI during compaction.

If the intensifier switch 270 is set to "no" or after the intensifier tool 136 has been positioned as described above if the intensifier switch was set to "yes," the next step is compaction. To start compaction, vacuum is released on the inner and outer covers 22, 26 by opening the outlet vent and outer cover vent valves 116, 124. In one embodiment, the inlet vent valve 108 and the inlet restrictor 44 are also opened to release vacuum on the inner cover 22. The outer cover 26 is kept vented during compaction cycling. Next, vacuum is reintroduced to the inner cover 22 by closing the vent valves 108, 116 and opening at least one of the vacuum valves 102, 106, 112. The vacuum in the inner cover interior 24 may be pulled by introducing vacuum to the interior from the inlet vacuum line 36 with the outlet vacuum line 52 closed, from the outlet vacuum line with the inlet vacuum line closed or through both lines being open. If vacuum is pulled through the inlet vacuum line 36, the vacuum may be pulled through the second sub-circuit, including the unregulated valve 106, because a regulated vacuum is generally not needed during compaction. In one embodiment, it is preferred to pull the vacuum through the outlet vacuum line 52 during compaction cycling while keeping the inlet circuit closed by closing each inlet valves 102, 106, 108 and/or the inlet restrictor 44. The release and reintroduction of vacuum is performed a predetermined number of times or cycles. During compaction cycling, the compaction indicator 196 flashes green and the inlet unregulated valve indicator 214, the inlet vent valve indicator 210, the outlet vacuum valve indicator 228 and the outlet vent valve indicator 226 change between unlit and lit green corresponding to whether the respective valve 106, 108, 112, 116 is open or closed. In one embodiment, the apparatus 10 performs ten vacuum introduction/release cycles during the compaction step.

The controller 10 can be configured to display a cycle running time of each compaction cycle (i.e., time between each application of pressure and release of pressure) or to display a total running time (i.e., a time between the first compaction application of vacuum and the final release of pressure) on the compaction timer display 246. In one embodiment, the compaction indicator 196 communicates a particular cycle being performed by flashing a number of times corresponding to the number of the particular cycle with pauses between such communications. For example, the controller 64 may repeatedly flash the compaction indicator 196 five times, with pauses after each fifth flash, to indicate the apparatus 10 is on the fifth compaction cycle. Such a communication may be helpful, for example, to ensure a user does not loose count of which cycle is being performed thereby avoiding performing too many cycles or too few. The controller 64 can be programmed to flash other indicators associated with multiple steps to indicate which step is being performed. After a final compaction cycle, the compaction indicator 196 turns solid green to indicate that compaction and intensification if applicable, has been completed. Whether intensification is performed, the compaction cycles compact the pre-infusion part 16 by compressing components (e.g., fibers) of the part closer together.

After the compaction cycles have been performed, a supplementary inner cover 22 leak check is performed in the manner described above to verify the integrity of the inner cover interior 24 formed by the inner cover and the part support 20 seal. If an intensification step was performed, the supplemental inner cover 22 leak check is performed while the intensification tool 136 is still positioned over and pressurized to press against the part 16. Only after a successful supplementary inner cover leak check may a supplementary outer cover 26 leak check be performed. In one embodiment, a vacuum is maintained in the inner cover 22 during the outer cover 26 leak check. The outer cover 26 leak check is performed in the manner described above to verify the integrity of the outer cover interior 28 formed by the outer cover and the part support 20 seal. In one embodiment, the vacuum pulled on the inner and outer covers 22, 26 is held from a final compaction cycle and through to these final inner and outer cover leak checks. After the supplementary inner and outer cover leak checks, vacuum is again introduced to the outer cover 26 so the inner cover 22 and outer cover are under vacuum during the infusion of resin. Also after the supplementary inner and outer cover leak checks, the intensifier tool 136, if installed, is removed from the part 16/part support 20. To remove the intensifier tool 136, the expanders 142 are disconnected from the pressure source 94 and vented to atmosphere through the pneumatic valve 154 or other venting valve (not shown) in the intensifier tool circuit 82. After the expanders 142 are vented to atmosphere, the tool braces 144 and tool 136 are removed. Before the apparatus 10 signals the user that the resin infusing step of the infusion process can be performed, the controller 64 ensures the part 16, part support 20 and resin 18 are within target temperatures ranges using the first, second, third and fourth thermal sensors 318, 320, 322, 324.

Upon completion of the final inner and outer cover 22, 26 leak checks and confirmation of appropriate temperatures, the resin infusion indicator 198 flashes yellow to indicate the resin infusing step of the resin infusion process may be initiated. The user then places the canister 42 holding a predetermined amount of resin 18 into the inlet vacuum container 40 and seals the inlet vacuum container. The predetermined amount of resin 18 depends on factors including the size, shape and make-up (e.g., number of plies or fiber density) of the part 16 being infused. It is important to determine the predetermined amount of resin 18 carefully because having too little resin will result in running out of resin during infusion thereby ruining the part by creating voids therein. Conversely, having too much resin 18 increases a cost of the infusions process and increases the likelihood of unwanted exothermic conditions occurring in the canister 42. Next, the user initiates resin infusing by pressing the infusion button 280. After the resin infusion button 280 has been pressed, the resin infusion indicator 198 will flash green to indicate the resin infusing step is in progress.

The apparatus 10 actuates the inlet vacuum container heating device 176 by way of the container heating device controller 180. The inlet restrictor indicator 216 should be green indicating that the inlet restrictor 44 remains closed and the container heating device indicator 206 turns green to indicate the container heating device is operating. The apparatus 10 introduces a full vacuum to the part 16 through the outlet vacuum circuit 76 and outlet vacuum line 52 from the vacuum source 86 by opening the outlet vacuum valve 112. After the inlet restrictor 44 is closed, the apparatus 10 pulls a regulated vacuum in the inlet vacuum container 40 by closing the unregulated inlet valve 106, opens the regulated inlet valve 102 and regulates the vacuum with the inlet regulator 100. The inlet vent valve indicator 210 and the unregulated inlet valve indicator 214 will turn green to indicate the inlet vent valve 108 and unregulated inlet valve 106 have been closed, respectively, and the regulated inlet valve indicator 212 will be unlit to indicate the regulated inlet valve 102 is open. The material delivery line restrictor indicator 218 remains green to indicate the material delivery line restrictor 166 is closed until the controller 64 determines that exothermic conditions exist in the canister 42 and opens the material delivery line restrictor to release material 164 into the canister to neutralize the resin thereby ending the exothermic condition. In one embodiment, the regulated vacuum is introduced to the inlet vacuum container 40 for about 30 seconds before any other steps are initiated to allow the pressure in the container to stabilize. The inlet controls display 240 displays the vacuum reading. After the timed event, the controller 64 ensures the pressure in the inlet container 40 is within the desired range using the inlet transducer 104. Prior to initiating resin transfer through the part, the apparatus 10 also activates the inlet vacuum container heating device controller 180 and ensures the part 16 and resin 18 are at desired temperatures. In one embodiment, a target temperature for the resin 18 is about 170° F. The displays 250-260 will display the temperatures being measured by the respective thermal sensors 318-328. If the part 16 or resin 18 temperatures are not at desired levels, the controller 64 adjusts the part and resin temperatures as needed using the heating devices 178, 180.

The apparatus 10 initiates the infusion of resin 18 through the part 16 by opening the inlet restrictor 44, thereby pulling a regulated vacuum on the part from the inlet side 38 of the part and inner cover interior 24. A inlet restrictor indicator 216 will become unlit to indicate the inlet restrictor 44 has been opened. The differential between the full vacuum pulled on the outlet side 54 of the part 16 and inner cover interior 24 by the outlet vacuum line 52 and the regulated vacuum (e.g., about 15 inches Hg) pulled on the inlet side 38 of the part and interior by the inlet vacuum line 36 draws the resin 18 out of the inlet vacuum container 40 and through the part. The controller 64 can be programmed with a time for infusing the part 16 with resin 18. As will be appreciated by those skilled in the art, the amount of time for infusing resin 18 depends on variables including a part 16 size, a part shape, a part make-up and the presence and positioning of resin transfer media 32, 34. Appropriate infusing times for particular conditions can be determined by experience. Although infusion may be carried out for other amounts of time without departing from the scope of the present invention, in one embodiment the infusing time is between about 40 minutes and about 60 minutes. During the resin infusing step, the resin infusion timer display 238 displays the time elapsed since starting the infusing step or the time remaining in the infusing step. The resin infusing step can be terminated by pressing the termination switch 266, in which case the inlet restrictor 44 would immediately close and the infusion termination indicator 204 will give a predetermined signal (e.g., flash red) to indicate the infusion was terminated. When the resin infusing time has been reached, the apparatus 10 closes the inlet restrictor 44. The inlet restrictor indicator 216 turns green indicating the inlet restrictor 44 is closed and the resin infusion indicator 198 turns solid green indicating the infusing step is complete.

The apparatus 10 may follow resin infusing with a predetermined amount of breakdown time to allow the user to manually clamp and cut the vacuum lines 36, 52 before the apparatus releases all residual vacuums and pressures to atmosphere and shuts down. Although other breakdown times may be used without departing from the scope of the present invention, in one embodiment the breakdown time is between about 10 minutes and about 15 minutes. During the breakdown time, the user can manually clamp the inlet vacuum line 36, such as by using vice grips, on a part side of the inlet vacuum container 40 and clamp the outlet vacuum line 52.

The user may clamp the outlet vacuum line 52 at about the same time the apparatus 10 is closing the inlet restrictor 44. After clamping the vacuum lines 36, 52 during the breakdown time, the user can cut the lines on an apparatus 10 side of the clamp (not shown). In one embodiment, the user uses a clamping and sealing device (not shown), which can clamp and cut (e.g., by ultrasonic welding) the inlet and outlet vacuum lines 35, 52 adjacent the delivery arms 58 or a metal portion the lines may have adjacent the delivery arms. Also, during the breakdown time, the user can disconnect connections leading to the thermal sensors 318, 320 previously embedded in the part. In one embodiment, the part 16 is made slightly oversized so portions having the thermal sensors 318, 320 and any other extraneous items can be removed without diminishing part integrity. After the breakdown time has expired, the apparatus 10 turns off the vacuum source 86 or disconnects itself from vacuum in the case where the source is external to the apparatus and moves all vacuum and fluid pressure valves to their default open position, except for the restrictors 44, 166, which stay closed, for user safety and the corresponding indicators become lit or unlit, accordingly. The apparatus 10 may be turned off by pressing the "off" button 264 unless it will be used to cure the part 16.

After the resin infusing step, the part 16 is cured. The vacuum on the outer cover 26 should be maintained after the infusing step and through curing to ensure part 16 shape. In one embodiment, the part 16 is placed in a conventional curing oven (not shown). In another embodiment, the part 16 is cured using the apparatus 10 and the part support heating blanket 178. In this embodiment, a cover or box (not shown) may be positioned over the part 16 to increase the amount of heat the part is exposed to. In one embodiment, a target curing temperature is between about 200° F. and about 400° F. As will be appreciated by those skilled in the art, an appropriate curing temperature depends on variables including the type of resin 18 used and the part 16 size. The part support heating device 178 may be connected to a curing heating device controller (not shown) that heats the part support heating device to a curing temperature, higher than that used for infusion. Alternatively, it is contemplated that the part support heating device controller 182 may operate according to a cure program that heats the part support heating device 178 to the higher cure temperature. Before, after or during curing, the user can remove the resin canister 42 from the inlet vacuum container 40 and neutralize and discard of any unused resin 18. The inlet and outlet lines 36, 52 can then be replaced in preparation for using the apparatus 10 to infuse another part 16.

The apparatus 10 can be transitioned from automatic to manual mode during automatic operation by switching the automatic/manual mode switch 268 to "manual." For a smooth transition from the automatic mode to the manual mode, the user should ensure that every switch is positioned according to the current operation of the corresponding component as indicated by the corresponding indicator. For example, if the outlet vent valve indicator 226 is unlit, indicating the outlet vent valve 116 is open, the user should ensure the outlet vent valve switch 302 is set to "open" before switching the automatic/manual mode switch 268 to "auto." Whether manual mode is set from the start of an infusion process or transitioned to during operation in the automatic mode, the manual controls 286-314 allow control over the respective valves and operations. Because the automatic controls 272-284 are inoperable during manual mode, the processes associated with the automatic controls are performed manually. For example, instead of the apparatus 10 timing the duration of the inner cover 24 leak check, the user must time the check and review the pressure change within the inner cover interior 24 during the entire check. As another example, instead of the apparatus 10 initiating the infusing of resin 18 in the infusing step by opening the inlet restrictor 44 automatically after the predetermined temperatures and pressures have been determined by the controller 64, the user must open the inlet restrictor by changing the inlet restrictor switch 292 to "open."

Manual mode operation of the apparatus 10 has various benefits over performing conventional manual controlled atmospheric pressurized resin infusion. For example, information displayed by the apparatus 10 corresponding to signals received by the controller 64 from the thermal sensors 318-328 and transducers 104, 114, 122, 150 can be very helpful to a user of the apparatus in the manual mode. Another benefit of the manual mode operation is the ability of a user to perform a portion of a particular process in the automatic mode and a portion in the manual mode. This allows a user to perform one or more steps in a manner different from a manner in which the controller 64 is programmed to perform the steps in the automatic mode. This may be helpful, for example, for testing and the creation of special parts.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. Resin infusion apparatus comprising:
resin infusion components;
vacuum circuitry for providing a vacuum to at least some of the components;
fluid circuitry for selectively introducing pressurized fluid to at least some of the components;
a controller for controlling operation of the fluid circuitry and the vacuum circuitry in a sequence of steps that cause the components to perform resin infusion;
a plurality of indicators, responsive to the controller, for indicating operator action during resin infusion; and
an auxiliary infusion machine port operatively connected to the controller for connecting the apparatus to an auxiliary resin infusion machine.

2. Resin infusion apparatus comprising:
resin infusion components;
vacuum circuitry for providing a vacuum to at least some of the components;
fluid circuitry for selectively introducing pressurized fluid to at least some of the components;
a controller for controlling operation of the fluid circuitry and the vacuum circuitry in a sequence of steps that cause the components to perform resin infusion;
a plurality of indicators, responsive to the controller, for indicating operator action during resin infusion; and
a plurality of thermal sensors for providing thermal information to the controller, the thermal sensors including a first thermal sensor for measuring a temperature of a part being infused with resin, a second thermal sensor for measuring a temperature of the resin, and a third thermal sensor for measuring a temperature of an inlet vacuum container;

wherein the sequence is halted and certain steps in the sequence are locked to ensure the sequence is performed in the proper order, steps are not skipped and subsequent steps are not performed until earlier steps are completely performed.

3. The apparatus of claim 2, wherein the resin infusion components include a compaction intensifier tool, wherein the fluid circuitry includes an intensifier tool fluid circuit; and wherein the controller controls the intensifier tool fluid circuit to selectively introduce pressurized fluid to the compaction intensifier tool.

4. The apparatus of claim 2, wherein the resin infusion components include a reservoir operatively connected to a inlet vacuum container by a material delivery line for selectively delivering material to the inlet vacuum container for mixture with the resin and a material delivery line restrictor operatively connected to the material delivery line for controlling an amount of material delivered to the inlet vacuum container from the reservoir, wherein the fluid circuitry includes a reservoir restrictor fluid circuit; and wherein the controller controls the reservoir restrictor fluid circuit to selectively introduce pressurized fluid to the material delivery line restrictor.

5. The apparatus of claim 2, wherein the resin infusion components include a part support, an inner cover securable to the part support to define with the support a sealed interior, and an outer cover securable to the part support for enclosing the inner cover, wherein the controller locks out a leak check until an inner or outer cover is repaired.

6. Apparatus as set forth in claim 2, wherein the vacuum circuitry includes:
an inlet vacuum circuit adapted to connect to a vacuum source and configured to apply a vacuum to an inner cover by way of an inlet vacuum container adapted to hold resin; and
an outlet vacuum circuit adapted to connect to the vacuum source and configured to apply a vacuum to the interior formed by the inner cover by way of an outlet vacuum line;
wherein the controller prevents a leak check from being performed until the inner cover is repaired.

7. Apparatus as set forth in claim 6 wherein the vacuum circuitry further includes an outer cover vacuum circuit, the apparatus further comprising:
an inlet vacuum port for connecting the inlet vacuum circuit to an inlet vacuum container for selectively introducing a vacuum to the inlet vacuum container;
an outlet vacuum port for connecting the outlet vacuum circuit to an outlet vacuum line for selectively introducing a vacuum to the outlet vacuum line; and
an outer cover port for connecting the outer cover vacuum circuit to an outer cover for selectively introducing a vacuum to the outer cover;
wherein the controller locks out a leak check until the outer cover is repaired.

8. Apparatus as set forth in claim 7 wherein the vacuum source comprises a vacuum pump operatively connected to the controller and in fluid communication with the vacuum source line for introducing a vacuum to the inlet vacuum circuit, the outlet vacuum circuit and the outer cover vacuum circuit.

9. Apparatus as set forth in claim 7 wherein the outer cover vacuum circuit includes an outer cover valve, an outer cover transducer for measuring pressure in the outer cover vacuum circuit and an outer cover vent valve.

10. Apparatus as set forth in claim 7 further comprising an inlet restrictor fluid circuit including at least two inlet restrictor valves connected in parallel and operatively connected to the controller for selectively permitting and restricting flow between the inlet vacuum container and the inner cover.

11. Apparatus as set forth in claim 10 wherein the apparatus is adapted for use in combination with a reservoir operatively connected to said inlet vacuum container by a material delivery line for selectively delivering material to the inlet vacuum container for mixture with the resin and a material delivery line restrictor operatively connected to the material delivery line for controlling an amount of material delivered to the inlet vacuum container from the reservoir and the apparatus further comprises a reservoir restrictor fluid circuit in fluid communication with a pressurized fluid source line, operatively connected to the controller and operatively connectable to the material delivery line restrictor for selectively introducing pressurized fluid to the material delivery line restrictor.

12. Apparatus as set forth in claim 11 wherein said reservoir restrictor fluid circuit includes two reservoir valves connected in parallel between the pressurized fluid source and the material delivery line restrictor.

13. Apparatus as set forth in claim 7 wherein said plurality of indicators include a vacuum source indicator for indicating when the vacuum source is operating; an inner cover leak check indicator for indicating whether an inner cover leak is being performed; and an outer cover leak check indicator for indicating whether an outer cover leak check is being performed.

14. Apparatus as set forth in claim 6 wherein said inlet vacuum circuit includes a first sub-circuit having a regulator, a regulated inlet valve and an inlet vacuum circuit transducer for measuring pressure in the first sub-circuit and a second sub-circuit in parallel with the first sub-circuit having an unregulated inlet valve and an inlet vent valve.

15. Apparatus as set forth in claim 6 wherein said outlet vacuum circuit includes an outlet vacuum circuit valve, an outlet vacuum line transducer for measuring pressure in the outlet vacuum circuit and an outlet vent valve.

16. Resin infusion apparatus comprising:
resin infusion components;
vacuum circuitry for providing a vacuum to at least some of the components, the vacuum circuitry including an inlet vacuum circuit adapted to connect to a vacuum source and configured to apply a vacuum to an inner cover by way of an inlet vacuum container adapted to hold resin, and an outlet vacuum circuit adapted to connect to the vacuum source and configured to apply a vacuum to the interior formed by the inner cover by way of an outlet vacuum line, wherein said inlet vacuum circuit includes a first sub-circuit having a regulator, a regulated inlet valve and an inlet vacuum circuit transducer for measuring pressure in the first sub-circuit and a second sub-circuit in parallel with the first sub-circuit having an unregulated inlet valve and an inlet vent valve;
fluid circuitry for selectively introducing pressurized fluid to at least some of the components;
a controller for controlling a sequence of manual and automated steps so that the fluid circuitry and the vacuum circuitry cause the components to perform resin infusion; and
a plurality of indicators, responsive to the controller, for indicating manual action during resin infusion;
wherein the sequence is halted and certain steps in the sequence are locked to ensure that manual steps are not skipped and subsequent manual steps are not performed until earlier steps are completely performed, including preventing a leak check from being performed until the inner cover is repaired.

* * * * *